(12) United States Patent
Uechi et al.

(10) Patent No.: US 12,104,506 B2
(45) Date of Patent: Oct. 1, 2024

(54) PLANT AND OPERATION METHOD THEREFOR

(71) Applicant: MITSUBISHI HEAVY INDUSTIES, LTD., Tokyo (JP)

(72) Inventors: Hideyuki Uechi, Tokyo (JP); Naoki Hisada, Yokohama (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 18/205,196

(22) Filed: Jun. 2, 2023

(65) Prior Publication Data

US 2023/0304422 A1    Sep. 28, 2023

Related U.S. Application Data

(62) Division of application No. 17/363,684, filed on Jun. 30, 2021, now Pat. No. 11,708,773, which is a
(Continued)

(30) Foreign Application Priority Data

Mar. 30, 2016   (JP) ................. 2016-068262

(51) Int. Cl.
*F01K 23/10*   (2006.01)
*F01K 9/00*   (2006.01)
(Continued)

(52) U.S. Cl.
CPC ............... *F01K 23/10* (2013.01); *F01K 9/00* (2013.01); *F02C 6/18* (2013.01); *F02C 7/141* (2013.01);
(Continued)

(58) Field of Classification Search
CPC ........ F01D 25/12; F01D 25/125; F01D 25/18; F01K 23/10; F02C 6/18; F02C 7/14;
(Continued)

(56) References Cited

U.S. PATENT DOCUMENTS 4,516,403 A    5/1985   Tanaka
6,094,914 A    8/2000   Zorner
(Continued)

FOREIGN PATENT DOCUMENTS

DE    10 2011 054 744      5/2012
EP         0 847 482     10/2001
(Continued)

OTHER PUBLICATIONS

International Search Report issued May 30, 2017 in International (PCT) Application No. PCT/JP2017/009228.
(Continued)

*Primary Examiner* — Scott J Walthour
(74) *Attorney, Agent, or Firm* — Wenderoth, Lind & Ponack, L.L.P.

(57) ABSTRACT

Provided is a plant that includes: a boiler; a device connected to the boiler; a water supply source that is configured to pool water; a water supply line that supplies water from the water supply source to the boiler; a cooler that transfers heat from a medium to be cooled to supply-water, which is the water flowing along the water supply line; a thermometer that determines a temperature of the medium to be cooled or the supply-water; and a temperature regulator that is configured to regulate the temperature of the medium to be cooled on the basis of the temperature determined by the thermometer.

8 Claims, 12 Drawing Sheets

Related U.S. Application Data division of application No. 16/088,157, filed as application No. PCT/JP2017/009228 on Mar. 8, 2017, now Pat. No. 11,078,808.

(51) Int. Cl.
  *F02C 6/18* (2006.01)
  *F02C 7/141* (2006.01)
  *F02C 7/18* (2006.01)

(52) U.S. Cl.
  CPC ............... *F02C 7/18* (2013.01); *F02C 7/185* (2013.01); *F05D 2220/72* (2013.01); *F05D 2260/232* (2013.01)

(58) Field of Classification Search
  CPC .... F02C 7/141; F02C 7/16; F02C 7/18; F02C 7/185; F05D 2220/72; F05D 2220/76–77; F05D 2260/232; F22B 33/00
  See application file for complete search history.

(56) References Cited

U.S. PATENT DOCUMENTS

| | | |
|---|---|---|
| 6,318,089 B1 | 11/2001 | Hiraga et al. |
| 8,739,510 B2 | 6/2014 | Sivasankaran et al. |
| 2002/0144505 A1 | 10/2002 | Sonoda |
| 2009/0301078 A1 | 12/2009 | Chillar et al. |
| 2011/0005477 A1 | 1/2011 | Terashima et al. |
| 2012/0102962 A1 | 5/2012 | Sivasankaran et al. |
| 2014/0083108 A1 | 3/2014 | Kunihiro |
| 2015/0184593 A1 | 7/2015 | Kraft |
| 2015/0318763 A1 | 11/2015 | Kubota et al. |
| 2016/0195013 A1 | 7/2016 | Epstein |
| 2017/0074164 A1 | 3/2017 | Uechi et al. |
| 2018/0045080 A1 | 2/2018 | Uechi et al. |

FOREIGN PATENT DOCUMENTS

| | | |
|---|---|---|
| JP | 09-158704 | 6/1997 |
| JP | 11-173161 | 6/1999 |
| JP | 2000-282895 | 10/2000 |
| JP | 2006-009592 | 1/2006 |
| JP | 2007-064049 | 3/2007 |
| JP | 2009-236014 | 10/2009 |
| JP | 2009-299682 | 12/2009 |
| JP | 2012-062825 | 3/2012 |
| JP | 2012-117517 | 6/2012 |
| JP | 2013-217615 | 10/2013 |
| JP | 2014-009606 | 1/2014 |
| JP | 2014-129799 | 7/2014 |
| JP | 2015-183594 | 10/2015 |
| JP | 2015-183595 | 10/2015 |
| WO | 2015/146786 | 10/2015 |
| WO | 2016/148008 | 9/2016 |
| WO | 2017/187619 | 11/2017 |

OTHER PUBLICATIONS

English Translation of the Written Opinion of the International Searching Authority issued May 30, 2017 in International (PCT) Application No. PCT/JP2017/009228.
Office Action issued Nov. 27, 2020 in U.S. Appl. No. 16/088,157.
Office Action issued Jun. 24, 2020 in U.S. Appl. No. 16/088,157.
English translation of WO 2015146786 A1 (Year: 2015).
Office Action issued Oct. 14, 2022 in U.S. Appl. No. 17/363,684.

PLANT AND OPERATION METHOD THEREFOR

TECHNICAL FIELD

The present invention relates to a plant having a boiler and an operation method therefor.

Priority is claimed on Japanese Patent Application No. 2016-068262, filed Mar. 30, 2016, the content of which is incorporated herein by reference.

Background Art

Boilers heat water to generate steam. In many cases, this steam is sent to a steam turbine. The steam exhausted from the steam turbine is returned to water by a steam condenser. This water is returned to the boiler as supply-water.

A plant disclosed in Patent Document 1 below includes a gas turbine that sends a high-temperature exhaust gas to a boiler, and a steam turbine that is driven by steam generated by the boiler. A medium to be cooled for which cooling is required in the process of operating these turbines flows to components constituting the gas turbine or the steam turbine. This plant has a cooler that allows heat exchange between the supply-water sent to the boiler and the medium to be cooled, and heats the supply-water while cooling the medium to be cooled.

Since the temperature of the supply-water flowing into the boiler is increased in the plant, steam can be effectively generated.

CITATION LIST

Patent Document

[Patent Document 1]
Japanese Unexamined Patent Application, First Publication No. 2012-117517

SUMMARY OF INVENTION

Technical Problem

In the technology disclosed in Patent Document 1 above, heat of the medium to be cooled can be effectively used to heat the supply-water, but there is a problem that a temperature of the medium to be cooled cannot be sufficiently lowered in some cases.

Therefore, the present invention is directed to providing a plant capable of managing a temperature of a medium to be cooled while effectively using heat of the medium to be cooled, and an operation method therefor.

Solution to Problem

To achieve the object, a plant as an aspect according to the present invention includes: a boiler configured to heat water to generate steam; a device directly or indirectly connected to the boiler; a water supply source that is configured to pool water; a water supply line configured to supply the water of the water supply source to the boiler; a medium-to-be-cooled line along which a medium to be cooled related to the device flows; a cooler configured to transfer heat of the medium to be cooled to supply-water that is the water flowing along the water supply line, and heat the supply-water while cooling the medium to be cooled; a thermometer configured to determine a temperature of the medium to be cooled or the supply-water; and a temperature regulator configured to regulate the temperature of the medium to be cooled on the basis of the temperature determined by the thermometer.

In the plant, the cooler transfers the heat of the medium to be cooled to the supply-water, and cools the medium to be cooled while heating the supply-water. For this reason, the heat of the medium to be cooled can be effectively used. In the plant, the temperature regulator regulates the temperature of the medium to be cooled. For this reason, the temperature of the medium to be cooled can be managed to a proper temperature.

Here, in the plant, the temperature regulator may have an auxiliary heat exchanger that is configured to exchange heat between the medium to be cooled or the supply-water and an external medium, and a heat exchange amount regulator that is configured to regulate an amount of heat exchange in the auxiliary heat exchanger. In the plant, the temperature regulator may have the auxiliary heat exchanger. Thereby, a range in which the temperature of the medium to be cooled is regulated can be increased as compared with a case in which the temperature of the medium to be cooled is regulated only using the supply-water. For example, the temperature regulator has the auxiliary heat exchanger. Thereby, the temperature of the medium to be cooled can be lowered as compared with a case in which the temperature of the medium to be cooled is lowered only using the supply-water.

In the plant having the auxiliary heat exchanger, the auxiliary heat exchanger may have a medium auxiliary heat exchanger that is provided on the medium-to-be-cooled line and is configured to exchange heat between the medium to be cooled and the external medium, and the heat exchange amount regulator may have a flow rate regulator that is configured to regulate a flow rate of at least one of the medium to be cooled flowing into the medium auxiliary heat exchanger and the external medium on the basis of the temperature determined by the thermometer. In the plant, the temperature regulator has the medium auxiliary heat exchanger. Thereby, even when the supply-water does not flow along the water supply line, the temperature of the medium to be cooled can be regulated.

In the plant having the auxiliary heat exchanger, the auxiliary heat exchanger may have a supply-water auxiliary heat exchanger that is provided on the water supply line and is configured to exchange heat between the supply-water and the external medium, and the heat exchange amount regulator may have a flow rate regulator that is configured to regulate a flow rate of at least one of the supply-water flowing into the supply-water auxiliary heat exchanger and the external medium on the basis of the temperature determined by the thermometer. In the plant, the temperature regulator has the supply-water auxiliary heat exchanger. Thereby, without changing the medium-to-be-cooled line, the range in which the temperature of the medium to be cooled is regulated can be widened.

In the plant as the aspect, the temperature regulator may have a supply-water return line that is configured to return at least some of the supply-water, which flows out of the cooler to the water supply line, to the water supply source, and a flow rate regulator that is configured to regulate a flow rate of the supply-water flowing along the supply-water return line on the basis of the temperature determined by the thermometer. In the plant, the flow rate of the supply-water flowing along the supply-water return line is regulated, and thereby the flow rate of the supply-water flowing along the water supply line can be regulated. For this reason, in the plant, the range in which the temperature of the medium to be cooled is regulated can be increased as compared with a case in which the flow rate of the supply-water flowing along the water supply line is constant. In addition, in the plant, with a simple constitution in which the auxiliary heat exchanger is not provided, the range in which the temperature of the medium to be cooled is regulated can be widened.

In the plant as the aspect, the cooler may have a heat exchanger that is configured to exchange heat between the medium to be cooled and the intermediate medium, a heat transfer device that is configured to transfer heat of the intermediate medium to the supply-water, and an intermediate medium line that is configured to force the intermediate medium to circulate between the heat exchanger and the heat transfer device. The thermometer may determine the temperature of the medium to be cooled. The temperature regulator may have a flow rate regulator that is configured to regulate a flow rate of the intermediate medium flowing into the heat exchanger on the basis of the temperature of the medium to be cooled which is determined by the thermometer.

In any one of the plants, a plurality of coolers including the cooler may be provided on the medium-to-be-cooled line in series, and the temperature regulator may be configured to regulate the temperature of the medium to be cooled that flows out of the cooler located at a farthest downstream side of a flow of the medium to be cooled among the plurality of coolers provided on the medium-to-be-cooled line.

In any one of the plants, the plant may include: a plurality of medium-to-be-cooled lines including the medium-to-be-cooled line; and the cooler for each of the plurality of medium-to-be-cooled lines. The temperatures of the media to be cooled flowing into the plurality of coolers may be different from one another in the plurality of coolers. Among the plurality of coolers, the cooler into which the medium to be cooled having a high temperature flows may be disposed at a position located at a downstream side of a flow of the supply-water on the water supply line relative to the cooler in which the medium to be cooled having a low temperature flows.

The supply-water of the plant is heated in turn by the plurality of coolers in the process of flowing along the water supply line, and thus the temperature thereof increases toward the downstream side of the water supply line. In addition, in the plant, among the plurality of coolers provided on the water supply line, the cooler located closer to the downstream side of the flow of the supply-water has a higher temperature of the medium to be cooled flowing thereinto. For this reason, in the plant, the temperature of the supply-water can be effectively increased.

In any one of the plants, the plant may have: as device, a gas turbine that is configured to burn fuel and is driven by a combustion gas, and a steam turbine that is driven by steam; as the water supply source, a steam condenser that is configured to return steam exhausted from the steam turbine to water; and as the cooler, one or more GT coolers that is configured to transfer heat of the medium to be cooled in the gas turbine to the supply-water. The boiler may be connected to the gas turbine such that the combustion gas driving the gas turbine flows into the boiler as an exhaust gas, and be connected to the steam turbine such that the steam generated by the boiler flows into the steam turbine. The water supply line may have a supply-water main line that connects the steam condenser and the boiler, a supply-water return line that branches off from the supply-water main line and is configured to return at least part of the supply-water flowing along the supply-water main line to the steam condenser, and a switching unit. All the one or more GT coolers may be disposed at positions located at an upstream side of a flow of the supply-water on the supply-water main line relative to the branch position of the supply-water return line. The switching unit may be configured to switch the flow of the supply-water between a supply-water return state in which the supply-water in the supply-water main line is returned to the steam condenser via the supply-water return line and a supply-water state in which the supply-water in the supply-water main line is sent to the boiler without being returned to the steam condenser.

In the plant, when the gas turbine and the steam turbine are operated, the switching unit is operated to bring the flow of the supply-water into the supply-water state. In the supply-water state, the supply-water from the steam condenser flows to the boiler via all the coolers. For this reason, when the flow of the supply-water is put in the supply-water state, the boiler generates steam, and the steam turbine is driven by the steam. In the supply-water state, the supply-water circulates in the boiler, the steam turbine, the steam condenser, and the supply-water main line. Therefore, the supply-water flows into all the GT coolers related to the gas turbine, and can cool the medium to be cooled in all the GT coolers. Furthermore, the supply-water (W) also flows into all the ST coolers related to the steam turbine, and can cool the medium to be cooled using all the ST coolers.

In the plant, when the steam turbine is brought to a halt and only the gas turbine is independently operated, the switching unit is operated, and the flow of the supply-water is put in the supply-water return state. Then, in the supply-water return state, the supply-water from the steam condenser is returned to the steam condenser via the supply-water return line. In the supply-water return state, the supply-water circulates in the steam condenser, the supply-water main line, and the supply-water return line. For this reason, the supply-water does not flow into the boiler, and the boiler generates no steam. Therefore, the steam turbine is not driven. In the plant, all the GT coolers related to the gas turbine are disposed at an upstream side from the branch position of the supply-water return line on the supply-water main line. For this reason, even when the flow of the supply-water is put in the supply-water return state, the supply-water flows into all the GT coolers, and can cool the medium to be cooled in all the GT coolers.

In any one of the plants, the plant may have: as the device, a gas turbine that is configured to burn fuel and is driven by a combustion gas, and a steam turbine that is driven by steam; as the water supply source, a steam condenser that is configured to return steam exhausted from the steam turbine to water; and as the cooler, one or more GT coolers that is configured to transfer heat of the medium to be cooled in the gas turbine to the supply-water. The boiler may be connected to the gas turbine such that the combustion gas driving the gas turbine flows into the boiler as an exhaust gas, and be connected to the steam turbine such that the steam generated by the boiler flows into the steam turbine. The water supply line may have a supply-water main line that connects the steam condenser and the boiler, a supply-water return line that branches off from the supply-water main line and is configured to return at least part of the supply-water flowing along the supply-water main line to the steam condenser, and a switching unit. The switching unit may be configured to switch the flow of the supply-water between a supply-water return state in which the supply-water in the supply-water main line is returned to the steam condenser via the supply-water return line and a supply-water state in which the supply-water in the supply-water main line is sent to the boiler without being returned to the steam condenser. At least one of the one or more GT coolers may be disposed at a position located at a downstream side of a flow of the supply-water on the supply-water main line relative to the branch position of the supply-water return line. The temperature regulator for the downstream side GT cooler disposed at the position located at the downstream side of the flow of the supply-water on the supply-water main line relative to the branch position of the supply-water return line may be any one of a first temperature regulator having a medium auxiliary heat exchanger that is configured to exchange heat between the medium to be cooled and an external medium and a heat exchange amount regulator that is configured to regulate an amount of heat exchange in the medium auxiliary heat exchanger, and a second temperature regulator that is provided on a supply-water return line that connects a portion located at a downstream side of the flow of the supply-water flowing along the supply-water main line on the basis of the downstream side GT cooler on the supply-water main line to a portion located at an upstream side thereof, and has a supply-water auxiliary heat exchanger that is configured to exchange heat between the supply-water flowing along the supply-water return line and an external medium and a flow rate regulator that is configured to regulate a flow rate of the supply-water flowing from the downstream side to the upstream side on the supply-water return line.

In the plant, the steam turbine is brought to a halt, and only the gas turbine can be independently operated.

In any one of the plants, the plant may have: as the device, a gas turbine that is configured to burn fuel and is driven by a combustion gas, and a steam turbine that is driven by steam; as the water supply source, a steam condenser that is configured to return steam exhausted from the steam turbine to water; and as the cooler, one or more GT coolers that is configured to transfer heat of the medium to be cooled in the gas turbine to the supply-water. The boiler may be connected to the gas turbine such that the combustion gas driving the gas turbine flows into the boiler as an exhaust gas, and be connected to the steam turbine such that the steam generated by the boiler flows into the steam turbine. The water supply line may have a supply-water main line that connects the steam condenser and the boiler. The temperature regulator for the one or more GT coolers may be any one of a first temperature regulator having a medium auxiliary heat exchanger that is configured to exchange heat between the medium to be cooled and an external medium and a heat exchange amount regulator that is configured to regulate an amount of heat exchange in the medium auxiliary heat exchanger, and a second temperature regulator that is provided on a supply-water return line that connects a portion located at the downstream side of the flow of the supply-water flowing along the supply-water main line on the basis of the downstream side GT cooler on the supply-water main line and a portion located at an upstream side thereof, and has a supply-water auxiliary heat exchanger that is configured to exchange heat between the supply-water flowing along the supply-water return line and an external medium and a flow rate regulator that is configured to regulate a flow rate of the supply-water flowing from the downstream side to the upstream side on the supply-water return line.

In the plant, the steam turbine is brought to a halt, and only the gas turbine can be independently operated.

To achieve the object, an operation method for a plant as an aspect according to the present invention is an operation method for a plant that includes a boiler configured to heat water to generate steam, a device directly or indirectly connected to the boiler; a water supply source that is configured to pool water, a water supply line configured to supply the water of the water supply source to the boiler, and a medium-to-be-cooled line along which a medium to be cooled related to the device flows, and includes: a cooling process of transferring heat of the medium to be cooled to supply-water that is the water flowing along the water supply line and heating the supply-water while cooling the medium to be cooled; a temperature determining process of determining a temperature of the medium to be cooled or the supply-water; and a temperature regulating process of regulating the temperature of the medium to be cooled on the basis of the temperature determined in the temperature determining process.

Here, in the operation method for a plant, the temperature regulating process may include an auxiliary heat exchanging process of exchanging heat between the medium to be cooled or the supply-water and an external medium, and a heat exchange amount regulating process of regulating an amount of heat exchange in the auxiliary heat exchanging process.

In the operation method for a plant which performs the auxiliary heat exchanging process, the auxiliary heat exchanging process may include a medium auxiliary heat exchanging process of exchanging heat between the medium to be cooled flowing along the medium-to-be-cooled line and the external medium, and the heat exchange amount regulating process may include a flow rate regulating process of regulating a flow rate of at least one of the medium to be cooled and the external medium between which the heat is exchanged in the medium auxiliary heat exchanging process on the basis of the temperature determined in the temperature determining process.

In the operation method for a plant which performs the auxiliary heat exchanging process, the auxiliary heat exchanging process may include a supplied water auxiliary heat exchanging process of exchanging heat between the supply-water flowing along the water supply line and the external medium, and the heat exchange amount regulating process may include a flow rate regulating process of regulating a flow rate of at least one of the supply-water and the external medium between which the heat is exchanged in the supply-water auxiliary heat exchanging process on the basis of the temperature determined in the temperature determining process.

In the operation method for a plant as the aspect, the temperature regulating process may include a supplied water returning process of returning at least some of the supply-water heated in the cooling process to the water supply source, and a flow rate regulating process of regulating a flow rate of the supply-water returned to the water supply source on the basis of the temperature determined in the temperature determining process.

In the operation method for a plant as the aspect, the cooling process may include a heat exchanging process of changing heat between the medium to be cooled and an intermediate medium, and a heat transferring process of transferring heat of the intermediate medium to the supply-water, and the temperature of the medium to be cooled may be determined in the temperature determining process. The temperature regulating process may include a flow rate regulating process of regulating a flow rate of the intermediate medium on the basis of the temperature of the medium to be cooled which is determined in the temperature determining process.

In any one of the operation methods for a plant, the cooling process may be performed on the medium to be cooled at each of a plurality of positions on the medium-to-be-cooled line, and the temperature regulating process may include regulating the temperature of the medium to be cooled that is cooled in the cooling process performed at a farthest downstream side of a flow of the medium to be cooled among the plurality of cooling processes.

In any one of the operation methods for a plant, the plant may have a plurality of medium-to-be-cooled lines including the medium-to-be-cooled line, and the cooling process may be performed on each of the media to be cooled flowing along the plurality of medium-to-be-cooled lines. The temperatures of the media to be cooled may be different from one another on the plurality of cooling medium lines, and among the plurality of cooling processes, the cooling process in which the medium to be cooled having a high temperature is intended for heat exchange may include heating the supply-water at a downstream side of a flow of the supply-water on the water supply line relative to the cooling process in which the medium to be cooled having a low temperature is intended for heat exchange.

In any one of the operation methods for a plant, the plant may have: as the device, a gas turbine that is configured to burn fuel and is driven by a combustion gas, and a steam turbine that is driven by steam, and as the water supply source, a steam condenser that is configured to return steam exhausted from the steam turbine to water. The boiler may be connected to the gas turbine such that the combustion gas driving the gas turbine flows into the boiler as an exhaust gas, and be connected to the steam turbine such that the steam generated by the boiler flows into the steam turbine. The water supply line may have a supply-water main line that connects the steam condenser and the boiler, and a supply-water return line that branches off from the supply-water main line and is configured to return at least part of the supply-water flowing along the supply-water main line to the steam condenser. The cooling process may include one or more GT medium cooling processes of exchanging heat between the medium to be cooled and the supply-water in the gas turbine. All the one or more GT medium cooling processes may include heating the supply-water at an upstream side of a flow of the supply-water relative to the branch position of the supply-water return line on the supply-water main line. The switching process of switching the flow of the supply-water between a supply-water return state in which the supply-water in the supply-water main line is returned to the steam condenser via the supply-water return line and a supply-water state in which the supply-water in the supply-water main line is sent to the boiler without being returned to the steam condenser may be performed.

Advantageous Effects of Invention

According to an aspect of the present invention, a temperature of a medium to be cooled can be managed to a proper temperature while effectively using heat of the medium to be cooled related to a device that is directly or indirectly connected to a boiler.

DESCRIPTION OF EMBODIMENTS

Hereinafter, various embodiments of a plant according to the present invention and various modifications of temperature regulators that are components of the plant will be described with reference to the drawings.

First Embodiment of Plant

Figure 1:
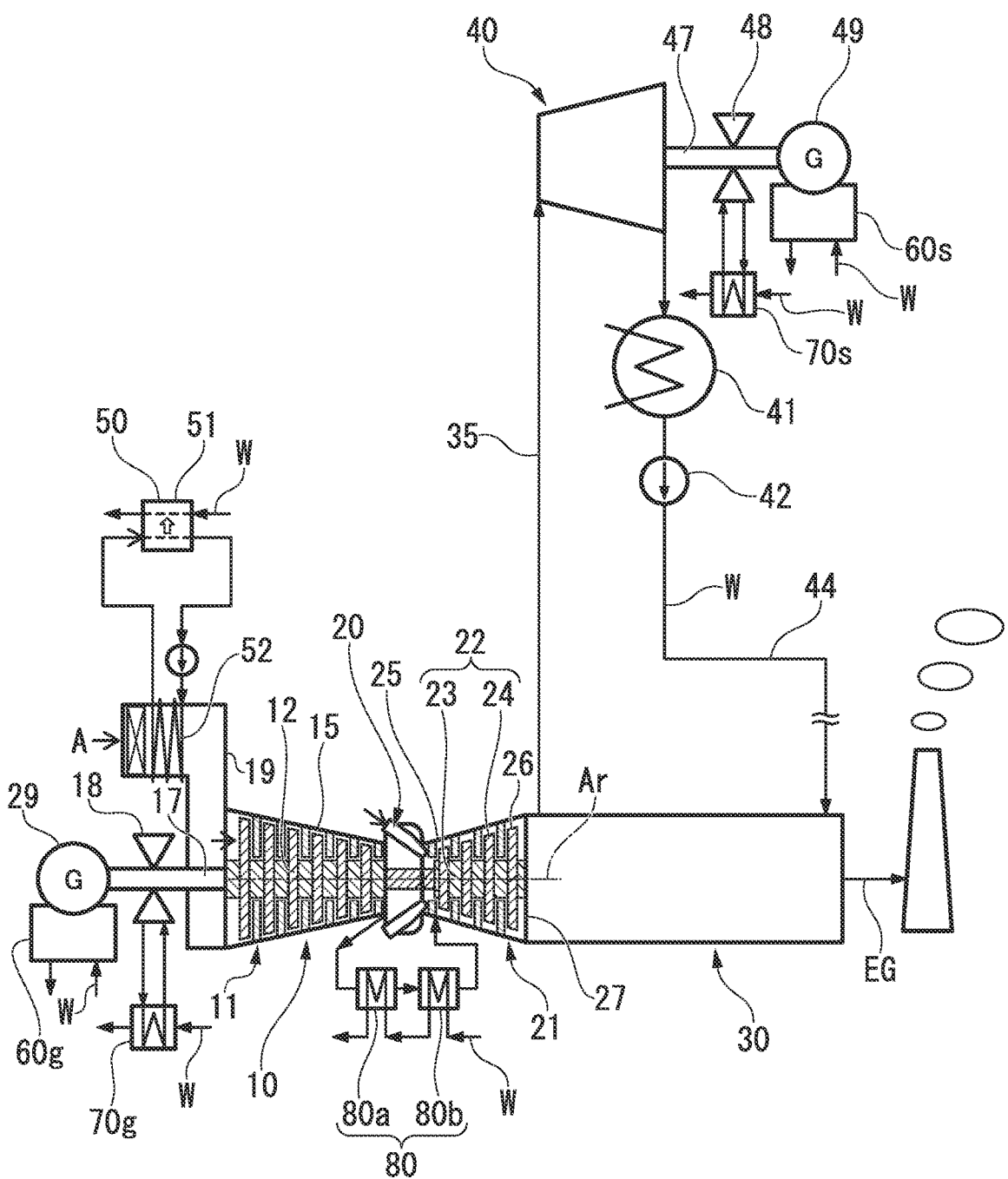
FIG. 1 is a system diagram of a plant in a first embodiment according to the present invention.

A first embodiment of a plant according to the present invention will be described with reference to FIGS. 1 and 2.
As shown in FIG. 1, a plant of the present embodiment includes a gas turbine 10, a generator 29 that generates electricity by driving the gas turbine 10, an exhaust heat recovery boiler 30, a steam turbine 40 that is driven by steam from the exhaust heat recovery boiler 30, a generator 49 that generates electricity by driving the steam turbine 40, a steam condenser (a water supply source) 41 that returns the steam exhausted from the steam turbine 40 to water, and a water supply pump 42 that sends the water in the steam condenser 41 to the exhaust heat recovery boiler 30. The plant includes a plurality of coolers 50, 60s, 60g, 70s, 70g, and 80 (see FIG. 2). The exhaust heat recovery boiler 30 heats water with heat of an exhaust gas EG exhausted from the gas turbine 10, and generates steam.
The gas turbine 10 includes a compressor 11 that compresses air A, an air intake duct 19 along which the air A drawn in by the compressor 11 flows, a combustor 20 that burns fuel in the air compressed by the compressor 11, and generates a combustion gas, and a turbine 21 that is driven by a high-temperature high-pressure combustion gas.

The compressor 11 has a compressor rotor 12 that is rotated about an axis Ar, and a compressor casing 15 that covers the compressor rotor 12.

The turbine 21 has a turbine rotor 22 that is rotated about the axis Ar by the combustion gas from the combustor 20, and a turbine casing 25 that covers the turbine rotor 22. The turbine rotor 22 has a rotor shaft 23 that extends in an axial direction parallel to the axis Ar, and a plurality of turbine blades 24 that are fixed to an outer circumference of the rotor shaft 23. A plurality of turbine vanes 26 are fixed to an inner circumferential surface of the turbine casing 25. An exhaust port 27 that exhausts the combustion gas passing through the inside of the turbine casing 25 as the exhaust gas is formed in the turbine casing 25.

An intake air cooler 50 for cooling the air drawn in by the compressor 11 is provided in the air intake duct 19. The gas turbine 10 is provided with a compressed air cooler 80 that cools the compressed air that is the air compressed by the compressor 11. The compressed air cooled by the compressed air cooler 80 acts as cooling air, and is sent to high-temperature components exposed to a high-temperature combustion gas among components constituting the gas turbine 10. The high-temperature components include, for instance, components constituting the combustor 20, the turbine blades 24 and the turbine vanes 26 of the turbine 21, and so on.

The combustor 20 is fixed to the turbine casing 25. The turbine rotor 22 and the compressor rotor 12 are rotated about the same axis Ar, and thus are mutually coupled to form a gas turbine rotor 17. The gas turbine rotor 17 is rotated by a high-temperature combustion gas from the combustor 20. A rotor of the aforementioned generator 29 is connected to the gas turbine rotor 17. The rotor and a stator of the generator 29 are cooled by a cooling medium such as hydrogen. For this reason, the generator 29 is provided with a generator cooler 60g that cools the cooling medium by means of heat exchange with water. The gas turbine rotor 17 is rotatably supported by a bearing 18. The bearing 18 is provided with a lubricant cooler 70g that cools a lubricant from the bearing 18 by means of heat exchange with water and returns the lubricant to the bearing 18.

The exhaust heat recovery boiler 30 is connected to the exhaust port 27 of the turbine casing 25. Therefore, the gas turbine 10 is a device that is connected to the exhaust heat recovery boiler 30. The generator 29 connected to the gas turbine 10 is a device that is indirectly connected to the exhaust heat recovery boiler 30. The exhaust heat recovery boiler 30 allows heat exchange between the exhaust gas exhausted from the gas turbine 10 and water, and heats the water to generate steam. The exhaust heat recovery boiler 30 and a steam inlet of the steam turbine 40 are connected by a steam line 35. Thus, the steam turbine 40 is a device that is connected to the exhaust heat recovery boiler 30. The generator 49 connected to the steam turbine 40 is a device that is indirectly connected to the exhaust heat recovery boiler 30.

The steam turbine 40 is driven by the steam from the exhaust heat recovery boiler 30. That is, the steam turbine rotor 47 is rotated by the steam. A rotor of the aforementioned generator 49 is connected to the steam turbine rotor 47. The rotor and a stator of the generator 49 are cooled by a cooling medium such as hydrogen. For this reason, the generator 49 is provided with a generator cooler 60s that cools the cooling medium by means of heat exchange with water. The steam turbine rotor 47 is rotatably supported by a bearing 48. The bearing 48 is provided with a lubricant cooler 70s that cools a lubricant from the bearing 48 by means of heat exchange with water and returns the lubricant to the bearing 48.

The steam condenser 41 is connected to a steam outlet of the steam turbine 40. The steam condenser 41 and the exhaust heat recovery boiler 30 are connected by a water supply line 44. A water supply pump 42 that boosts a pressure of supply-water W is provided on the water supply line 44. The supply-water W is water that flows from the steam condenser 41 into the water supply line 44 and flows along the water supply line 44.

Figure 2:
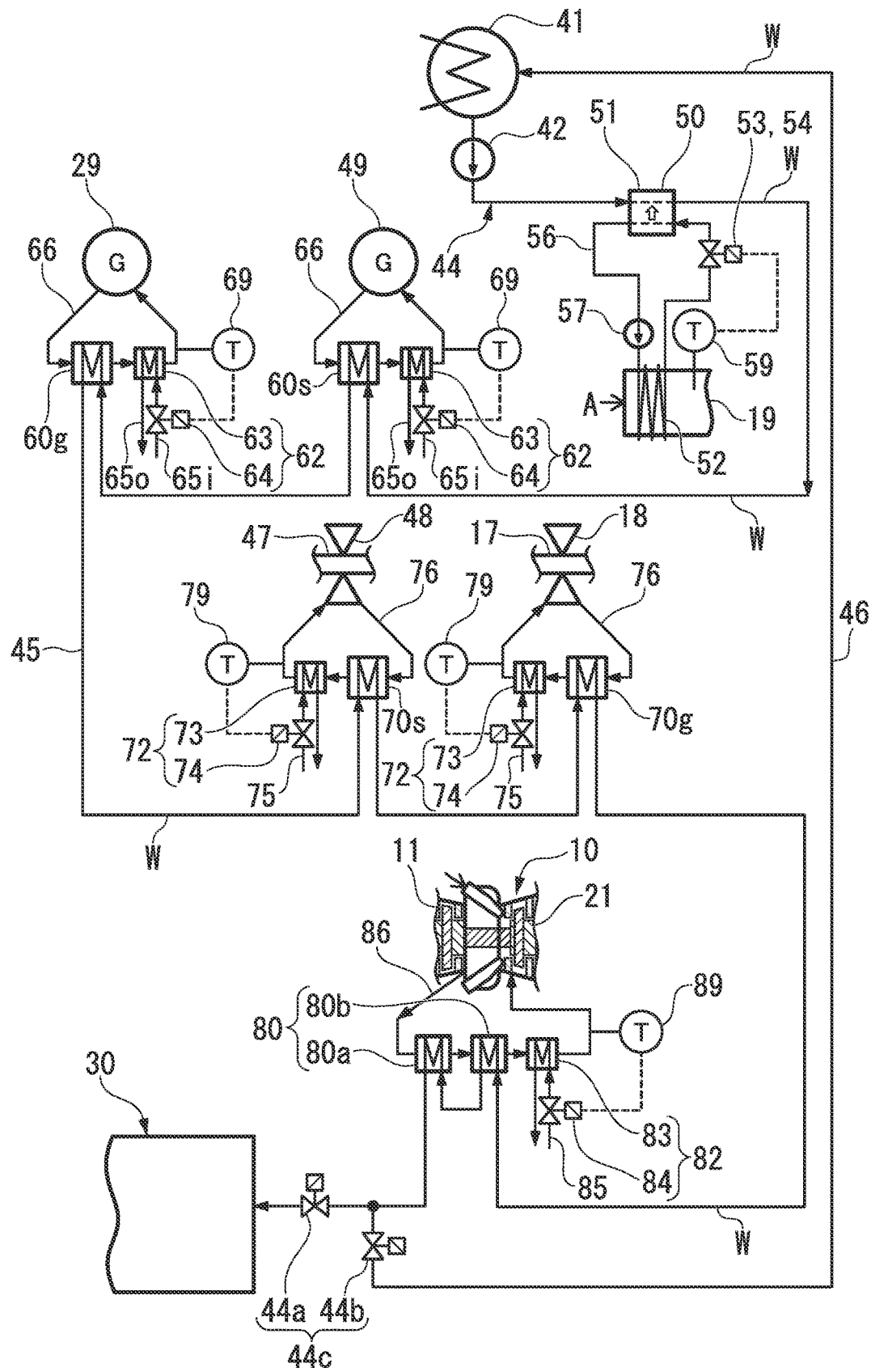
FIG. 2 is a system diagram of a water supply line in the first embodiment according to the present invention.

As shown in FIG. 2, the intake air cooler 50 has a heat exchanger 52, a freezer (a heat transfer device) 51, an intermediate medium line 56, and a medium pump 57. The heat exchanger 52 is provided on the air intake duct 19. The heat exchanger 52 allows heat exchange between air flowing through the air intake duct 19 and an intermediate medium, and cools the air while heating the intermediate medium. The freezer 51 is provided on the water supply line 44. The freezer 51 transfers heat of the intermediate medium heated by the heat exchanger 52 to the supply-water W. The intermediate medium line 56 causes the intermediate medium to circulate between the heat exchanger 52 and the freezer 51. The medium pump 57 is provided on the intermediate medium line 56. An intake air thermometer 59 and an intake air temperature regulator 53 are provided on the intake air cooler 50. The intake air thermometer 59 is provided on the air intake duct 19, and determines a temperature of the air flowing through the air intake duct 19. The intake air temperature regulator 53 regulates the temperature of the air A flowing through the air intake duct 19. The intake air temperature regulator 53 has a medium flow rate regulating valve (flow rate regulator) 54 that regulates the flow rate of the intermediate medium flowing along the intermediate medium line 56 on the basis of the temperature of the air A which is determined by the intake air thermometer 59. The intake air thermometer 59 determines the temperature of the air A inside the air intake duct 19 cooled by the intake air cooler 50.

The generator cooler 60s of the generator 49 connected to the steam turbine 40 allows heat exchange between the cooling medium such as hydrogen and the supply-water W, and cools the cooling medium while heating the supply-water W. Therefore, the generator cooler 60s is provided across the cooling medium line 66 along which the cooling medium flows and the water supply line 44. A medium thermometer 69 and a medium temperature regulator 62 are provided on the cooling medium line 66. The medium thermometer 69 is provided on the cooling medium line 66, and determines a temperature of the cooling medium. The medium temperature regulator 62 regulates the temperature of the cooling medium. The medium temperature regulator 62 has a medium auxiliary heat exchanger 63 and an external medium flow rate regulating valve (a heat exchange amount regulator) 64. The medium auxiliary heat exchanger 63 is disposed between a medium outlet of the generator cooler 60s and a medium inlet of the generator 49 on the cooling medium line 66. An inflow line 65i that guides an external medium to the medium auxiliary heat exchanger 63 and an outflow line 65o along which the external medium from the medium auxiliary heat exchanger 63 flows are connected to the medium auxiliary heat exchanger 63. The external medium flow rate regulating valve 64 is provided on one of the inflow line 65i and the outflow line 65o. The medium auxiliary heat exchanger 63 allows heat exchange between the cooling medium cooled by the generator cooler 60s and the external medium, and heats the external medium while cooling the cooling medium. The external medium flow rate regulating valve 64 regulates a flow rate of the external medium flowing into the medium auxiliary heat exchanger 63 on the basis of the temperature of the cooling medium which is determined by the medium thermometer 69. The medium thermometer 69 determines the temperature of the cooling medium that passes through the medium auxiliary heat exchanger 63.

The cooling medium is a medium to be cooled that is a cooling target for the generator cooler 60s. Therefore, the cooling medium line 66 is a medium-to-be-cooled line for the generator cooler 60s.

The generator cooler 60g of the generator 29 connected to the gas turbine 10 allows heat exchange between the cooling medium such as hydrogen and the supply-water W, and cools the cooling medium while heating the supply-water W. Therefore, the generator cooler 60g is provided across the cooling medium line 66 along which the cooling medium flows and the water supply line 44. A medium thermometer 69 and a medium temperature regulator 62 are provided on the cooling medium line 66. The medium thermometer 69 is provided on the cooling medium line 66, and determines a temperature of the cooling medium. The medium temperature regulator 62 regulates the temperature of the cooling medium. The medium temperature regulator 62 has a medium auxiliary heat exchanger 63 and an external medium flow rate regulating valve (a heat exchange amount regulator) 64. The medium auxiliary heat exchanger 63 is disposed between a medium outlet of the generator cooler 60g and a medium inlet of the generator 29 on the medium line. The external medium flow rate regulating valve 64 is provided on one of inflow and outflow lines 65i and 65o for an external medium which are connected to the medium auxiliary heat exchanger 63. The medium auxiliary heat exchanger 63 allows heat exchange between the cooling medium cooled by the generator cooler 60g and the external medium, and heats the external medium while cooling the cooling medium. The external medium flow rate regulating valve 64 regulates a flow rate of the external medium flowing into the medium auxiliary heat exchanger 63 on the basis of the temperature of the cooling medium which is determined by the medium thermometer 69. The medium thermometer 69 determines the temperature of the cooling medium that passes through the medium auxiliary heat exchanger 63.

The cooling medium is a medium to be cooled that is a cooling target for the generator cooler 60g. Therefore, the cooling medium line 66 is a medium-to-be-cooled line for the generator cooler 60g.

The lubricant cooler 70s in the steam turbine 40 allows heat exchange between the lubricant from the bearing 48 of the steam turbine rotor 47 and the supply-water W, and cools the lubricant while heating the supply-water W. Therefore, the lubricant cooler 70s is provided across a lubricant line 76 along which the lubricant flows and the water supply line 44. A lubricant thermometer 79 and a lubricant temperature regulator 72 are provided on the lubricant line 76. The lubricant thermometer 79 is provided on the lubricant line 76, and determines a temperature of the lubricant. The lubricant temperature regulator 72 regulates the temperature of the lubricant. The lubricant temperature regulator 72 has a lubricant auxiliary heat exchanger 73 and an external medium flow rate regulating valve (a heat exchange amount regulator) 74. The lubricant auxiliary heat exchanger 73 is disposed between a lubricant outlet of the lubricant cooler 70s and a lubricant inlet of the bearing 48 on the lubricant line 76. The external medium flow rate regulating valve 74 is provided on one of inflow and outflow lines 75i and 75o for an external medium which are connected to the lubricant auxiliary heat exchanger 73. The lubricant auxiliary heat exchanger 73 allows heat exchange between the lubricant cooled by the lubricant cooler 70s and the external medium, and heats the external medium while cooling the lubricant. The external medium flow rate regulating valve 74 regulates a flow rate of the external medium flowing into the lubricant auxiliary heat exchanger 73 on the basis of the temperature of the lubricant which is determined by the lubricant thermometer 79. The lubricant thermometer 79 determines the temperature of the lubricant passing through the lubricant auxiliary heat exchanger 73.

The lubricant is a medium to be cooled that is a cooling target for the lubricant cooler 70s. Therefore, the lubricant line 76 is a medium-to-be-cooled line for the lubricant cooler 70s.

The lubricant cooler 70g in the gas turbine 10 allows heat exchange between the lubricant from the bearing 18 of the gas turbine rotor 17 and the supply-water W, and cools the lubricant while heating the supply-water W. Therefore, the lubricant cooler 70g is also provided across a lubricant line 76 along which the lubricant flows and the water supply line 44. A lubricant thermometer 79 and a lubricant temperature regulator 72 are provided on the lubricant line 76. The lubricant thermometer 79 is provided on the lubricant line 76, and determines a temperature of the lubricant. The lubricant temperature regulator 72 regulates the temperature of the lubricant. The lubricant temperature regulator 72 has a lubricant auxiliary heat exchanger 73 and an external medium flow rate regulating valve (a heat exchange amount regulator) 74. The lubricant auxiliary heat exchanger 73 is disposed between a lubricant outlet of the lubricant cooler 70g and a lubricant inlet of the bearing 18 on the lubricant line 76. The external medium flow rate regulating valve 74 is provided on one of inflow and outflow lines 75i and 75o for an external medium which are connected to the lubricant auxiliary heat exchanger 73. The lubricant auxiliary heat exchanger 73 allows heat exchange between the lubricant cooled by the lubricant cooler 70g and the external medium, and heats the external medium while cooling the lubricant. The external medium flow rate regulating valve 74 regulates a flow rate of the external medium flowing into the lubricant auxiliary heat exchanger 73 on the basis of the temperature of the lubricant which is determined by the lubricant thermometer 79. The lubricant thermometer 79 determines the temperature of the lubricant passing through the lubricant auxiliary heat exchanger 73.

The lubricant is a medium to be cooled that is a cooling target for the lubricant cooler 70g. Therefore, the lubricant line 76 is a medium-to-be-cooled line for the lubricant cooler 70g.

The compressed air cooler 80 in the gas turbine 10 has a first air cooler 80a and a second air cooler 80b. The first air cooler 80a allows heat exchange between the compressed air from the compressor 11 and the supply-water W, and cools the compressed air while heating the supply-water W. The second air cooler 80b allows heat exchange between the compressed air cooled by the first air cooler 80a and the supply-water W before being heated by the first air cooler 80a, and cools the compressed air while heating the supply-water W. The compressed air cooled by the first air cooler 80a and the second air cooler 80b is sent to high-temperature components of the gas turbine 10 as cooling air. Therefore, the first air cooler 80a and the second air cooler 80b are provided across an extraction line 86, which connects the compressor 11 and the high-temperature components, and the water supply line 44. The second air cooler 80b is disposed closer to the high-temperature components than the first air cooler 80a on the extraction line 86, and is disposed closer to the steam condenser 41 than the first air cooler 80a on the water supply line 44. A cooling air thermometer 89 and a compressed air temperature regulator 82 are provided on the extraction line 86. The cooling air thermometer 89 is provided on the extraction line 86, and determines a temperature of the compressed air. The compressed air temperature regulator 82 regulates the temperature of the compressed air. The compressed air temperature regulator 82 has a compressed air auxiliary heat exchanger 83 and an external medium flow rate regulating valve (a heat exchange amount regulator) 84. The compressed air auxiliary heat exchanger 83 is disposed closer to the high-temperature components than the second air cooler 80b on the extraction line 86. The external medium flow rate regulating valve 84 is provided on the external medium line 85 connected to the compressed air auxiliary heat exchanger 83. The compressed air auxiliary heat exchanger 83 allows heat exchange between the compressed air cooled by the compressed air cooler 80 and the external medium, and heats the external medium while cooling the compressed air. The external medium flow rate regulating valve 84 regulates a flow rate of the external medium flowing into the compressed air auxiliary heat exchanger 83 on the basis of the temperature of the compressed air which is determined by the cooling air thermometer 89. The cooling air thermometer 89 determines the temperature of the compressed air passing through the compressed air auxiliary heat exchanger 83.

The compressed air is a medium to be cooled that is a cooling target for the compressed air cooler 80. Therefore, the extraction line 86 is a medium-to-be-cooled line for the compressed air cooler 80.

As shown in FIG. 2, the water supply line 44 has a supply-water main line 45, a supply-water return line 46, and a switching unit 44c. In FIG. 1, in order to make the figure easier to understand, for convenience, only the supply-water main line 45 of the water supply line 44 is shown as the water supply line 44, and the supply-water return line 46 and the switching unit 44c are omitted. The supply-water main line 45 connects the steam condenser 41 and the exhaust heat recovery boiler 30. The supply-water return line 46 branches off from the supply-water main line 45, and returns at least part of the supply-water W, which flows along the supply-water main line 45, to the steam condenser 41. The switching unit 44c switches a flow of the supply-water W between a supply-water return state in which the supply-water W in the supply-water main line 45 is returned to the steam condenser 41 via the supply-water return line 46 and a supply-water state in which the supply-water W in the supply-water main line 45 is sent to the exhaust heat recovery boiler 30 without being returned to the steam condenser 41. The switching unit 44c has a first valve 44a and a second valve 44b. The first valve 44a is provided at a position located closer to the exhaust heat recovery boiler 30 than the branch position of the supply-water return line 46 on the supply-water main line 45. The second valve 44b is provided on the supply-water return line 46. The switching unit 44c may be made up of a three-way valve that is provided at the branch position of the supply-water return line 46 on the supply-water main line 45.

Any of the intake air cooler 50, the generator cooler 60s of the generator 49 connected to the steam turbine 40, the generator cooler 60g of the generator 29 connected to the gas turbine 10, the lubricant cooler 70s of the steam turbine 40, the lubricant cooler 70g of the gas turbine 10, and the compressed air cooler 80, which are described above, is a cooler that cools a medium to be cooled related to a device that is directly or indirectly connected to the exhaust heat recovery boiler 30. Among the media to be cooled flowing into the coolers, the compressed air that is a medium to be cooled flowing into the compressed air cooler 80 has the highest temperature. Hereinafter, the lubricant that is a medium to be cooled flowing into the lubricant cooler 70g of the gas turbine 10, the lubricant that is a medium to be cooled flowing into the lubricant cooler 70s of the steam turbine 40, the cooling medium that is a medium to be cooled flowing into the generator cooler 60g of the generator 29 connected to the gas turbine 10, the cooling medium that is a medium to be cooled flowing into the generator cooler 60s of the generator 49 connected to the steam turbine 40, and the compressed air cooled by the intake air cooler 50 are lowered in temperature in this order. This is an example. For example, the temperature of the lubricant that is a medium to be cooled flowing into the lubricant cooler 70g of the gas turbine 10 may be lower than that of the lubricant that is a medium to be cooled flowing into the lubricant cooler 70s of the steam turbine 40.

The intake air cooler 50, the generator cooler 60s of the generator 49 connected to the steam turbine 40, the generator cooler 60g of the generator 29 connected to the gas turbine 10, the lubricant cooler 70s of the steam turbine 40, the lubricant cooler 70g of the gas turbine 10, and the compressed air cooler 80 are provided on the supply-water main line 45 from the upstream side to the downstream side of the flow of the supply-water W in this order side by side. Therefore, among the plurality of coolers, a cooler into which a medium to be cooled whose temperature is higher flows is disposed at a position located at a downstream side of the flow of the supply-water W on the supply-water main line 45 relative to a cooler into which a medium to be cooled whose temperature is lower flows.

Among the plurality of coolers, any of the coolers (the GT coolers) related to the gas turbine 10, particularly the intake air cooler 50, the generator cooler 60g of the generator 29 connected to the gas turbine 10, the lubricant cooler 70g of the gas turbine 10, and the compressed air cooler 80 is disposed closer to the steam condenser 41 than the branch position of the supply-water return line 46 on the supply-water main line 45. In the present embodiment, no coolers are disposed closer to the exhaust heat recovery boiler 30 than the branch position of the supply-water return line 46 on the supply-water main line 45. However, if some of the plurality of coolers are coolers (the ST coolers) related to the steam turbine 40, all or some of the ST coolers may be disposed closer to the exhaust heat recovery boiler 30 than the branch position of the supply-water return line 46 on the supply-water main line 45.

Examples of the external medium that exchanges heat with the medium to be cooled by means of the auxiliary heat exchangers 63, 73 and 83 described above may include sea water, lake water, river water, underground water, factory wastewater, atmospheric gas, or the like. When atmospheric gas that is a gas among these external media is used as the external medium, a flow rate regulator for regulating a flow rate of the atmospheric gas is, for instance, a fan that can change the amount of airflow.

Next, an operation of the plant of the present embodiment will be described.

The compressor 11 of the gas turbine 10 compresses air A that flows in via the air intake duct 19, and supplies the compressed air to the combustor 20. Fuel is also supplied to the combustor 20. The fuel is burnt in the compressed air in the combustor 20, and a high-temperature high-pressure combustion gas is generated. This combustion gas is sent from the combustor 20 to the combustion gas flow passage inside the turbine 21, and rotates the turbine rotor 22. The generator 29 connected to the gas turbine 10 generates electricity by rotating the turbine rotor 22.

The combustion gas that rotates the turbine rotor 22 is exhausted from the gas turbine 10 as an exhaust gas EG, and is discharged from a chimney to the atmosphere via the exhaust heat recovery boiler 30. The exhaust heat recovery boiler 30 recovers heat contained in the exhaust gas in the process in which the exhaust gas from the gas turbine passes through the exhaust heat recovery boiler 30.

To be specific, the exhaust heat recovery boiler 30 allows heat exchange between the water W and the exhaust gas EG, and heats the water W to generate steam. The steam flows into the steam turbine 40 via the steam line 35, and drives the steam turbine 40. The generator 49 connected to the steam turbine 40 generates electricity by driving the steam turbine 40. The steam exhausted from the steam turbine 40 flows into the steam condenser 41. The steam is cooled and condensed into water in the steam condenser 41. This water is boosted in pressure by the water supply pump 42 as the supply-water W, and is supplied to the exhaust heat recovery boiler 30 via the water supply line 44.

When the temperature of the air A drawn in by the compressor 11 is increased, the mass flow rate of the air A drawn in by the compressor 11 is reduced. Therefore, when the temperature of the air A drawn in by the compressor 11 is increased, the output of the gas turbine is reduced. Thus, in the present embodiment, the intake air cooler 50 transfers heat of the air A drawn in by the compressor 11 to the supply-water W, and heats the supply-water W while cooling the air A (a cooling process). To be specific, the heat exchanger 52 of the intake air cooler 50 allows heat exchange between the air A (the medium to be cooled) flowing through the air intake duct 19 and the intermediate medium, and cools the air A while heating the intermediate medium (a heat exchanging process). The freezer 51 of the intake air cooler 50 transfers heat of the intermediate medium heated by the heat exchanger 52 to the supply-water W, and cools the intermediate medium while heating the supply-water W (a heat transferring process).

When the gas turbine output is managed, the temperature of the air A drawn in by the compressor 11 is preferably managed. For this reason, in the present embodiment, the intake air cooler 50 is provided with the intake air thermometer 59 and the intake air temperature regulator 53. The intake air thermometer 59 determines the temperature of the air A flowing through the air intake duct 19 (a temperature determining process). The medium flow rate regulating valve 54 of the intake air temperature regulator 53 regulate the flow rate of the intermediate medium flowing along the intermediate medium line 56 such that the temperature of the air A which is determined by the intake air thermometer 59 falls within a target temperature range (a temperature regulating process and a flow rate regulating process). As a result, in the heat exchanger 52 of the intake air cooler 50, an amount of heat exchange between the intermediate medium and the air A is changed so that the temperature of the air A is within the target temperature range.

The high-temperature components exposed to the high-temperature high-pressure combustion gas are cooled, for instance, by air in order to enhance durability thereof. In the present embodiment, the cooling air is sent to the high-temperature components, and the high-temperature components are cooled by the cooling air. To be specific, in the present embodiment, the first air cooler 80a of the compressed air cooler 80 allows heat exchange between the compressed air from the compressor 11 and the supply-water W, and cools the compressed air while heating the supply-water W. Furthermore, the second air cooler 80b allows heat exchange between the compressed air cooled by the first air cooler 80a and the supply-water W prior to being heated by the first air cooler 80a, and cools the compressed air while heating the supply-water W (a cooling process). The compressed air cooled as described above is sent to the high-temperature components of the gas turbine 10 as cooling air.

When the durability of the high-temperature components is managed, the temperature of the cooling air is preferably managed. For this reason, in the present embodiment, the cooling air thermometer 89 and the compressed air temperature regulator 82 are provided on the extraction line 86 along which the cooling air flows. The compressed air auxiliary heat exchanger 83 of the compressed air temperature regulator 82 allows heat exchange between the compressed air cooled by the compressed air cooler 80 and the external medium, and cools the compressed air (a medium auxiliary heat exchanging process). The cooling air thermometer 89 determines the temperature of the compressed air passing through the compressed air auxiliary heat exchanger 83 (a temperature determining process). The external medium flow rate regulating valve (heat exchange amount regulator) 84 regulates the flow rate of the external medium flowing into the compressed air auxiliary heat exchanger 83 such that the temperature of the air which is determined by the cooling air thermometer 89 falls within a target temperature range (a temperature regulating process, a heat exchange amount regulating process, and a flow rate regulating process). As a result, in the compressed air auxiliary heat exchanger 83, an amount of heat exchange between the compressed air and the external medium is changed so that the temperature of the compressed air is within a target temperature range.

Each of the generators 29 and 49 is cooled by the cooling medium such as hydrogen in order to maintain the performance thereof and improve the durability thereof. In the present embodiment, the cooling medium is sent to the rotor and stator of each of the generators 29 and 49, and the rotor and the stator are cooled by the cooling medium. To be specific, in the present embodiment, each of the generator coolers 60s and 60g allows heat exchange between the cooling medium flowing along the cooling medium line 66 and the supply-water W, and cools the cooling medium while heating the supply-water W (a cooling process). The cooled cooling medium is sent to the rotor and the stator via the cooling medium line 66, and cools the rotor and the stator.

When the performance and durability of each of the generators 29 and 49 are managed, the temperature of the cooling medium is preferably managed. For this reason, in the present embodiment, the medium thermometer 69 and the medium temperature regulator 62 are provided on the cooling medium line 66 along which the cooling medium flows. The medium auxiliary heat exchanger 63 of the medium temperature regulator 62 allows heat exchange between the cooling medium cooled by each of the generator coolers 60s and 60g and the external medium, and cools the cooling medium (a medium auxiliary heat exchanging process). The medium thermometer 69 determines the temperature of the cooling medium passing through the medium auxiliary heat exchanger 63 (a temperature determining process). The external medium flow rate regulating valve (the heat exchange amount regulator) 64 regulates the flow rate of the external medium flowing into the medium auxiliary heat exchanger 63 such that the temperature of the cooling medium which is determined by the medium thermometer 69 falls within a target temperature range (a temperature regulating process, a heat exchange amount regulating process, and a flow rate regulating process). As a result, in the medium auxiliary heat exchanger 63, an amount of heat exchange between the cooling medium and the external medium is changed so that the temperature of the cooling medium is within the target temperature range.

The lubricant is supplied to each of the bearings 18 and 48 of the turbine 21 in order to maintain the performance thereof and improve the durability thereof. This lubricant is cooled to achieve this goal. In the present embodiment, the lubricant is supplied to each of the bearings 18 and 48, and is cooled by each of the lubricant coolers 70s and 70g. Each of the lubricant coolers 70s and 70g allows heat exchange between the lubricant flowing along the lubricant line 76 and the supply-water W, and cools the lubricant while heating the supply-water W (a cooling process). The cooled lubricant is supplied to each of the bearings 18 and 48 via the lubricant line 76.

When the performance and durability of each of the bearings 18 and 48 is managed, the temperature of the lubricant supplied to each of the bearings 18 and 48 is preferably managed. For this reason, in the present embodiment, the lubricant thermometer 79 and the lubricant temperature regulator 72 are provided on the lubricant line 76 along which the lubricant flows. The lubricant auxiliary heat exchanger 73 of the lubricant temperature regulator 72 allows heat exchange between the lubricant cooled by each of the lubricant coolers 70s and 70g and the external medium, and cools the lubricant (a medium auxiliary heat exchanging process). The lubricant thermometer 79 determines the temperature of the lubricant passing through the lubricant auxiliary heat exchanger 73 (a temperature determining process). The external medium flow rate regulating valve (the heat exchange amount regulator) 74 regulates the flow rate of the external medium flowing into the lubricant auxiliary heat exchanger 73 such that the temperature of the lubricant which is determined by the lubricant thermometer 79 falls within a target temperature range (a temperature regulating process, a heat exchange amount regulating process, and a flow rate regulating process). As a result, in the lubricant auxiliary heat exchanger 73, an amount of heat exchange between the lubricant and the external medium is changed so that the temperature of the lubricant is within the target temperature range.

As described above, in the present embodiment, each of the coolers transfers the heat of the medium to be cooled in each device of the plant to the supply-water W, and cools the medium to be cooled while heating the supply-water W. For this reason, the heat of the medium to be cooled can be effectively used. In the present embodiment, the temperature of the medium to be cooled is regulated by the temperature regulator. For this reason, temperature of the medium to be cooled can be managed to a proper temperature. In the present embodiment, each of the auxiliary heat exchangers 63, 73 and 83 exchanges heat between the medium to be cooled and the external medium.

For this reason, in the present embodiment, a range in which the temperature of the medium to be cooled is regulated can be increased as compared with a case in which the temperature of the medium to be cooled is regulated only using the supply-water. For example, the temperature regulators have the auxiliary heat exchangers 63, 73 and 83. Thereby, the temperature of the medium to be cooled can be lowered as compared with a case in which the temperature of the medium to be cooled is lowered only using the supply-water. In the present embodiment, even when the supply-water does not flow along the water supply line 44, the temperature of the medium to be cooled can be regulated by the auxiliary heat exchangers 63, 73 and 83. In the present embodiment, for example, even when the steam turbine 40 is stopped and the supply-water does not flow along the water supply line 44, the temperatures of the lubricant and the cooling air of the gas turbine 10 can be regulated. Therefore, in the present embodiment, an independent operation of the gas turbine 10 is possible.

As shown in FIG. 2, the supply-water W of the present embodiment are heated in turn by the plurality of coolers 50, 60s, 60g, 70s, 70g, and 80 in the process of flowing along the supply-water main line 45, and thus the temperature thereof increases toward the downstream side of the supply-water main line 45. However, in the present embodiment, among the plurality of cooler 50, 60s, 60g, 70s, 70g, and 80 provided on the supply-water main line 45, the cooler located closer to the downstream side of the flow of the supply-water W has a higher temperature of the medium to be cooled flowing thereinto. For this reason, in the present embodiment, the temperature of the supply-water W can be effectively increased.

In the present embodiment, the switching unit 44c provided on the water supply line 44 is operated (a switching process), the steam turbine 40 is brought to a halt, and only the gas turbine 10 can be independently operated. In this case, the first valve 44a provided on the supply-water main line 45 is closed, and the second valve 44b provided on the supply-water return line 46 is opened. As a result, the supply-water W from the steam condenser 41 is returned to the steam condenser 41 via the supply-water return line 46. That is, the flow of the supply-water W enters the supply-water return state. In the supply-water return state, the supply-water W circulates in the steam condenser 41, the supply-water main line 45, and the supply-water return line 46. For this reason, the supply-water W does not flow into the exhaust heat recovery boiler 30, and the exhaust heat recovery boiler 30 generates no steam. Therefore, the steam turbine 40 is not driven. In the present embodiment, all the cooler 50, 60s, 60g, 70s, 70g, and 80 related to the gas turbine 10 are disposed closer to the steam condenser 41 than the branch position of the supply-water return line 46 on the supply-water main line 45. Even when the flow of the supply-water W is in the supply-water return state, the supply-water W flows into all the coolers (GT coolers) 50, 60g, 70g, and 80 related to the gas turbine 10, and can cool the medium to be cooled in all the GT coolers 50, 60g, 70g, and 80 (a GT medium cooling process).

In the present embodiment, when the gas turbine 10 and the steam turbine 40 are operated together, the first valve 44a provided on the supply-water main line 45 is opened, and the second valve 44b provided on the supply-water return line 46 is closed. As a result, the supply-water W from the steam condenser 41 flows into the exhaust heat recovery boiler 30 via the supply-water main line 45. That is, the flow of the supply-water W enters the supply-water state. In the supply-water state, the supply-water W flows from the steam condenser 41 to the exhaust heat recovery boiler 30, and does not flow along the supply-water return line 46. For this reason, the exhaust heat recovery boiler 30 generates steam, and the steam turbine 40 is driven by this steam. In the supply-water state, the supply-water W circulates in the exhaust heat recovery boiler 30, the steam line 35, the steam turbine 40, the steam condenser 41, and the supply-water main line 45. Therefore, the supply-water W flows into all the GT coolers 50, 60g, 70g, and 80 related to the gas turbine 10, and can cool the medium to be cooled in all the GT coolers 50, 60g, 70g, and 80 (a GT medium cooling process). Furthermore, the supply-water W also flows into all the coolers (ST coolers) 60s and 70s related to the steam turbine 40, and can cool the medium to be cooled in all the ST coolers 60s and 70s (an ST medium cooling process).

First Modification of the Temperature Regulator

Figure 3:
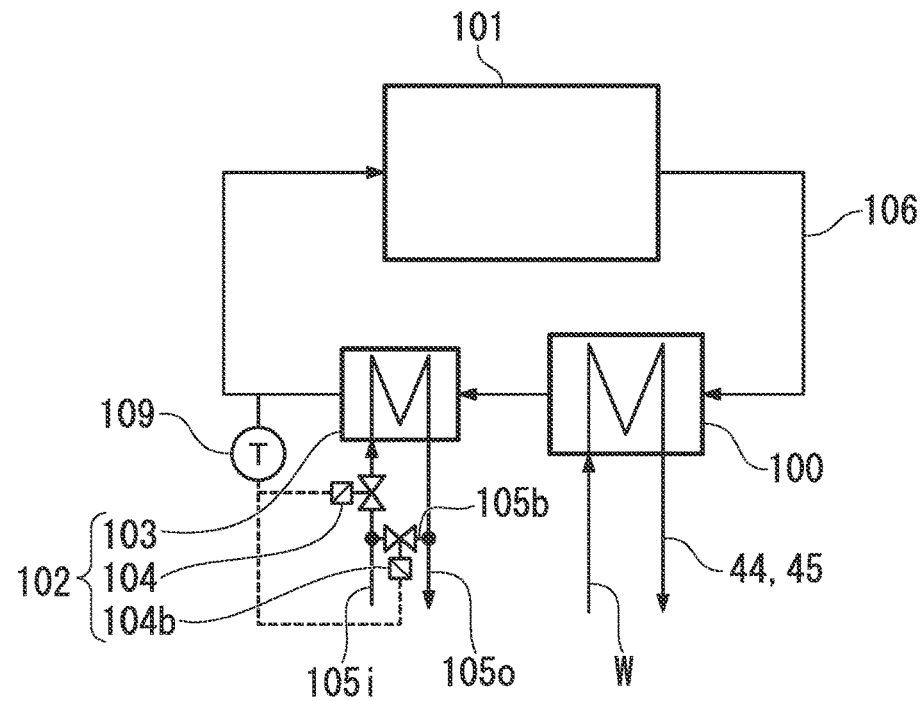
FIG. 3 is an illustrative diagram showing the constitution of a temperature regulator in a first modification according to the present invention.

A first modification of the temperature regulator will be described with reference to FIG. 3.

In the temperature regulator of the embodiment, the external medium flow rate regulating valve is provided on one of the inflow and outflow lines of the external medium which are connected to the auxiliary heat exchanger. However, as in this modification, a bypass line 105b that connects inflow and outflow lines 105i and 105o of an external medium for an auxiliary heat exchanger 103 may be provided, and an external medium flow rate regulating valve 104b may be provided on the bypass line 105b.

A cooler 100, the auxiliary heat exchanger 103, and a device 101 are provided on a medium-to-be-cooled line 106 of this modification. The coolers 100 of this modification and second to tenth modifications (to be described below) are equivalent to the coolers 60s, 60g, 70s, 70g, and 80 of the embodiment. The devices 101 of this modification and second to tenth modifications (to be described below) are equivalent to the generators 49 and 29 and the bearings 48 and 18 of the embodiment and the high-temperature components of the gas turbine 10. The temperature regulator 102 of this modification has the external medium flow rate regulating valve 104b and the auxiliary heat exchanger 103. The external medium flow rate regulating valve 104b regulates a flow rate of the external medium flowing along the bypass line 105b on the basis of a temperature of a medium to be cooled which is determined by a thermometer 109 provided on the medium-to-be-cooled line 106. In this way, even when the flow rate of the external medium flowing along the bypass line 105b is regulated, the flow rate of the external medium flowing into the auxiliary heat exchanger 103 can be regulated. Therefore, in this modification, the temperature of the medium to be cooled flowing along the medium-to-be-cooled line 106 can be regulated.

This modification is a modification of the temperature regulator with the auxiliary heat exchanger, but it may also be applied to a temperature regulator without the auxiliary heat exchanger. For example, this modification may also be applied to the intake air temperature regulator 53 for the intake air cooler 50 of the first embodiment. In this case, a bypass line for a heat exchanger 52 is provided on an intermediate medium line 56, and a medium flow rate regulating valve 54 is provided on this bypass line.

Second Modification of the Temperature Regulator

Figure 4:
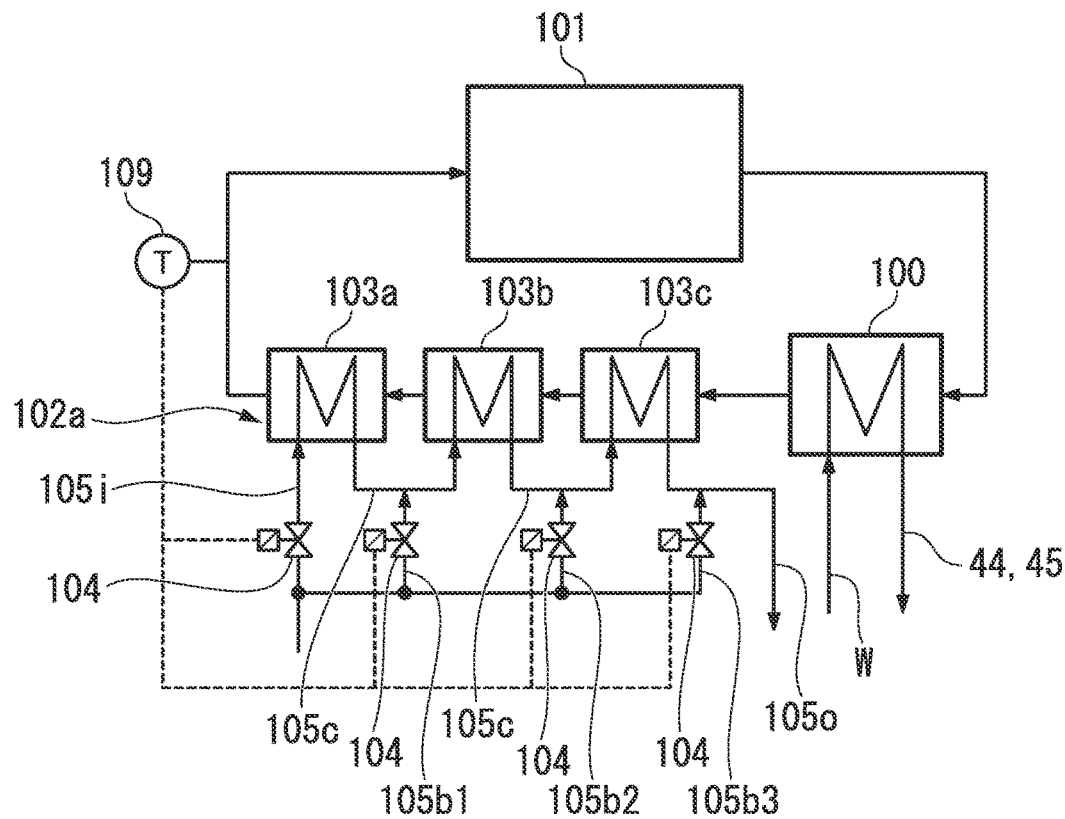
FIG. 4 is an illustrative diagram showing the constitution of a temperature regulator in a second modification according to the present invention.

A second modification of the temperature regulator will be described with reference to FIG. 4.

The temperature regulator of the embodiment has one auxiliary heat exchanger. However, as in this modification, a temperature regulator 102a may have a plurality of auxiliary heat exchangers 103a, 103b and 103c. The plurality of auxiliary heat exchangers 103a, 103b and 103c are disposed on a medium-to-be-cooled line 106 in series.

An inflow line 105i of an external medium is connected to an external medium inlet of one 103a of the plurality of auxiliary heat exchangers 103a, 103b and 103c which is located at a farthest downstream side of a flow of a medium to be cooled on the medium-to-be-cooled line 106. An outflow line 105o of the external medium is connected to an external medium outlet of one 103c of the plurality of auxiliary heat exchangers 103a, 103b and 103c which is located at a farthest upstream side of the flow of the medium to be cooled on the medium-to-be-cooled line 106. An external medium inlet of the middle auxiliary heat exchanger 103b between the auxiliary heat exchanger 103a located at a farthest downstream side and the auxiliary heat exchanger 103c located at a farthest upstream side ream side among the plurality of auxiliary heat exchangers 103a, 103b and 103c is connected to an external medium inlet of the auxiliary heat exchanger 103a, which is located at an upstream side of the flow of the medium to be cooled relative to the middle auxiliary heat exchanger 103b, and a connection line 105c. An external medium outlet of the middle auxiliary heat exchanger 103b is connected to an external medium inlet of the auxiliary heat exchanger 103c, which is located at an upstream side of the flow of the medium to be cooled relative to the middle auxiliary heat exchanger 103b, and a connection line 105c. The inflow line 105i and the plurality of connection lines 105c are connected to bypass lines 105b1 and 105b2. The inflow line 105i and the outflow line 105o are connected to a bypass line 105b3. External medium flow rate regulating valves 104 are provided on the inflow line 105i and the plurality of bypass lines 105b1 to 105b3, respectively.

The temperature regulator 102a of this modification has the plurality of auxiliary heat exchangers 103a, 103b and 103c and the plurality of external medium flow rate regulating valves 104, both of which has been described above.

As described above, the plurality of auxiliary heat exchangers 103a, 103b and 103c are provided, and the plurality of external medium flow rate regulating valves 104 are provided. Thereby, a flow rate of the external medium flowing into an integrated auxiliary heat exchanger obtained by adding up the plurality of auxiliary heat exchangers 103a, 103b and 103c can be regulated, and simultaneously a use area of a full heat-transfer surface of the integrated auxiliary heat exchanger can be changed. Therefore, in this modification, a degree of opening of each of the plurality of external medium flow rate regulating valves 104 determined by a thermometer 109 provided on the medium-to-be-cooled line 106 can be appropriately regulated on the basis of the temperature of the medium to be cooled determined by the thermometer 109 provided on the medium-to-be-cooled line 106.

Third Modification of the Temperature Regulator

Figure 5:
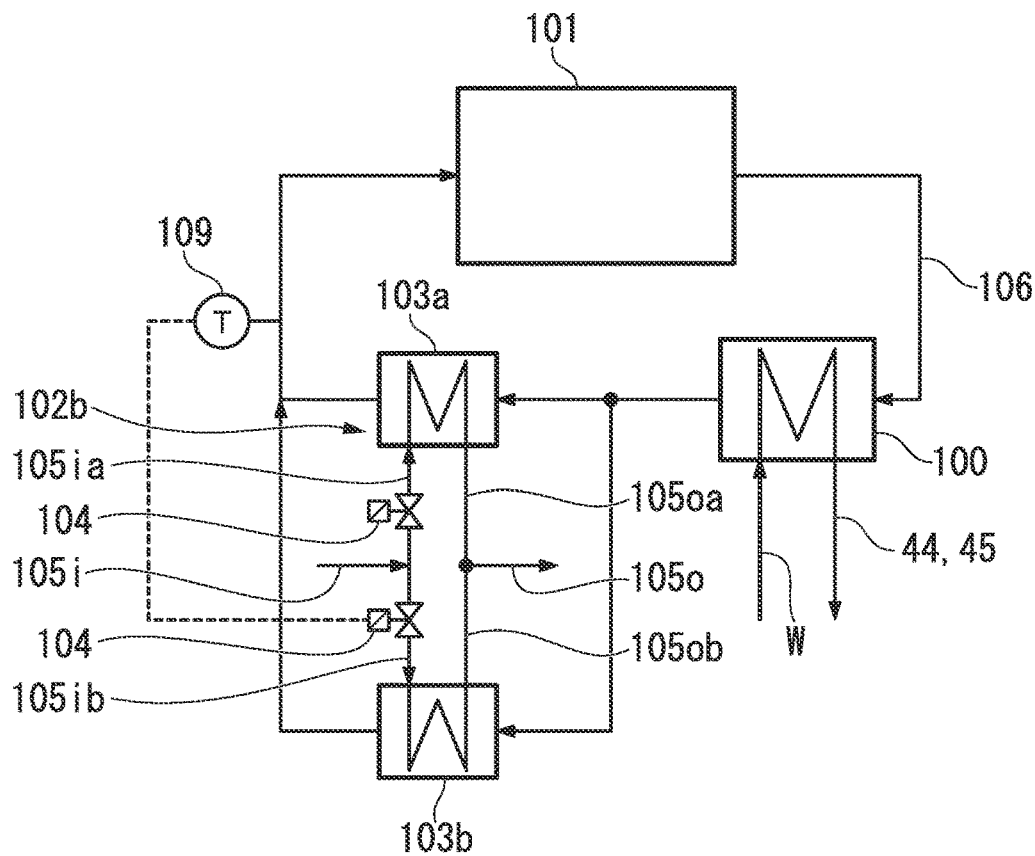
FIG. 5 is an illustrative diagram showing the constitution of a temperature regulator in a third modification according to the present invention.

A third modification of the temperature regulator will be described with reference to FIG. 5.

The temperature regulator 102a of the second modification is an example in which the plurality of auxiliary heat exchangers 103a and 103b are disposed on the medium-to-be-cooled line 106 in series. However, as in this modification, a plurality of auxiliary heat exchangers 103a and 103b may be disposed on a medium-to-be-cooled line 106 in parallel.

An inflow line 105i of an external medium branches off between the plurality of auxiliary heat exchangers 103a and 103b. Inflow branch lines 105ia and 105ib are connected to external medium inlets of the auxiliary heat exchangers 103a and 103b. An outflow line 105o of the external medium branches off between the plurality of auxiliary heat exchangers 103a and 103b. Outflow branch lines 105oa and 105ob are connected to external medium outlets of the auxiliary heat exchangers 103a and 103b. External medium flow rate regulating valves 104 are provided on the inflow branch lines 105ia and 105ib or the outflow branch lines 105oa and 105ob, respectively.

A temperature regulator 102b of this modification has the plurality of auxiliary heat exchangers 103a and 103b and the plurality of external medium flow rate regulating valves 104, both of which have been described above.

In this modification, a degree of opening of each of the plurality of external medium flow rate regulating valves 104 is changed, and thereby the amount of distribution of the external medium to the plurality of auxiliary heat exchangers 103a and 103b can be changed. Therefore, in this modification, the degree of opening of each of the plurality of external medium flow rate regulating valve 104 is appropriately regulated on the basis of a temperature of a medium to be cooled which is determined by a thermometer 109 provided on a medium-to-be-cooled line 106, and thereby the temperature of the medium to be cooled flowing along the medium-to-be-cooled line 106 can be regulated.

In this modification, the plurality of auxiliary heat exchangers 103a and 103b may be different from each other with regard to an amount of heat exchange between the external medium and the supply-water W. A method for making the amounts of heat exchange different from each other includes a method for making heat transfer areas of the plurality of auxiliary heat exchangers 103a and 103b different from each other, a method for making surface shapes of heat transfer pipes of the plurality of auxiliary heat exchangers 103a and 103b different from each other, and so on.

Fourth Modification of the Temperature Regulator

Figure 6:
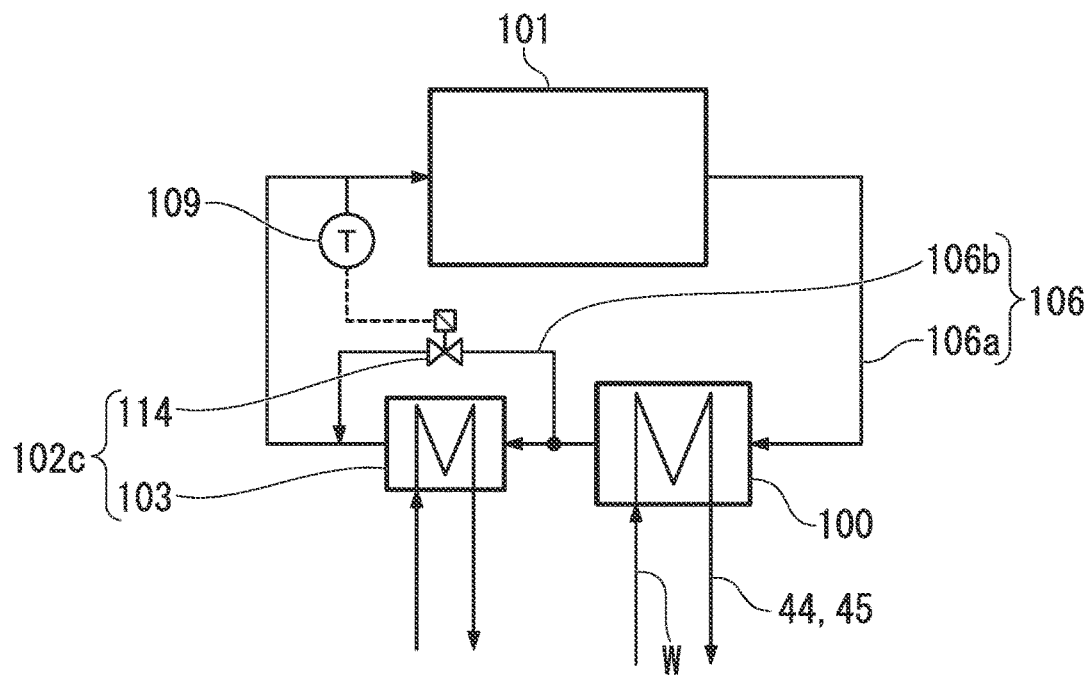
FIG. 6 is an illustrative diagram showing the constitution of a temperature regulator in a fourth modification according to the present invention.

A fourth modification of the temperature regulator will be described with reference to FIG. 6.

In the temperature regulator of the first embodiment and the temperature regulators of the first to third modifications, the flow rate of the external medium flowing into the auxiliary heat exchanger is regulated. However, as in this modification, a flow rate of a medium to be cooled flowing into an auxiliary heat exchanger 103 may be regulated. A temperature regulator 102c of this modification has the auxiliary heat exchanger 103 and a medium-to-be-cooled flow rate regulating valve 114.

A medium-to-be-cooled line 106 of this modification has a medium-to-be-cooled main line 106a and a medium-to-be-cooled bypass line 106b. The medium-to-be-cooled main line 106a is a circulation line for the medium to be cooled. A cooler 100, the auxiliary heat exchanger 103, and a device 101 into which the medium to be cooled passing through the cooler 100 and the auxiliary heat exchanger 103 flows are provided on the medium-to-be-cooled main line 106a. The medium-to-be-cooled bypass line 106b is connected to a position between the cooler 100 and the auxiliary heat exchanger 103 on the medium-to-be-cooled main line 106a and a position between the auxiliary heat exchanger 103 and the device 101 on the medium-to-be-cooled main line 106a. The medium-to-be-cooled bypass line 106b is a line that bypasses the auxiliary heat exchanger 103.

The medium-to-be-cooled flow rate regulating valve 114 of this modification is provided on the medium-to-be-cooled bypass line 106b. When a degree of opening of the medium-to-be-cooled flow rate regulating valve 114 is changed, and the flow rate of the medium to be cooled flowing along the medium-to-be-cooled bypass line 106b is changed, the flow rate of the medium to be cooled flowing into the auxiliary heat exchanger 103 provided on the medium-to-be-cooled main line 106a is changed. Therefore, in this modification, the degree of opening of the medium-to-be-cooled flow rate regulating valve 114 is appropriately regulated on the basis of a temperature of the medium to be cooled which is determined by a thermometer 109 provided on the medium-to-be-cooled main line 106a, and thereby the temperature of the medium to be cooled flowing along the medium-to-be-cooled line 106 can be regulated.

Fifth Modification of the Temperature Regulator

Figure 7:
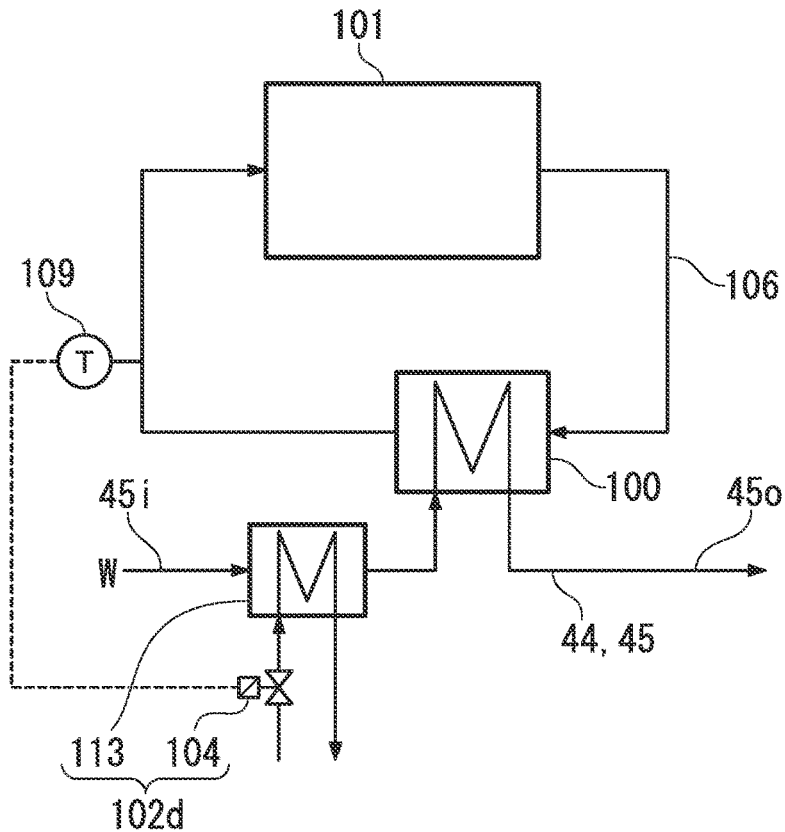
FIG. 7 is an illustrative diagram showing the constitution of a temperature regulator in a fifth modification according to the present invention.

A fifth modification of the temperature regulator will be described with reference to FIG. 7.

The auxiliary heat exchanger of the temperature regulator of the first embodiment and the auxiliary heat exchangers of the temperature regulators of the first to fourth modifications are provided on the medium-to-be-cooled lines. However, as in this modification, an auxiliary heat exchanger 113 may be provided on a water supply line 44.

As in the aforementioned embodiment and modifications, a cooler 100 is provided on the water supply line 44. That is, a first end of a supplied water inflow line 45i constituting a part of a supply-water main line 45 is connected to an inlet of the cooler 100 for supplied water, and a first end of an supplied water outflow line 45o constituting a part of the supply-water main line 45 is connect to an outlet of the cooler 100 for the supply-water W. A second end of the supply-water inflow line 45i is connected to a steam condenser 41. A second end of the supply-water outflow line 45o is connected to an exhaust heat recovery boiler 30.

A temperature regulator 102d of this modification has the auxiliary heat exchanger 113 provided on the supply-water inflow line 45i, and an external medium flow rate regulating valve 104 that regulates a flow rate of an external medium flowing into the auxiliary heat exchanger 113. The auxiliary heat exchanger 113 of this modification exchanges heat between the external medium and the supply-water W, and heats the external medium while cooling the supply-water W (a supplied water auxiliary heat exchanging process). The external medium flow rate regulating valve 104 regulates the flow rate of the external medium flowing into the auxiliary heat exchanger 113 on the basis of a temperature of a medium to be cooled which is determined by a thermometer 109 provided on a medium-to-be-cooled line 106 (a temperature regulating process, a heat exchange amount regulating process, and a flow rate regulating process). As a result, the temperature of the supply-water W flowing into the cooler 100 is changed, and the temperature of the medium to be cooled that exchanges heat with the supply-water W in the cooler 100 falls within a target temperature range.

It may be difficult to remodel the medium-to-be-cooled line 106, for instance to provide the auxiliary heat exchanger on the medium-to-be-cooled line 106. To be specific, the medium-to-be-cooled line 106 is previously assembled to a product in which the generator coolers 60s and 60g and the generators 29 and 49 in the first embodiment are integrated. For this reason, when the auxiliary heat exchanger 103 is provided on the medium-to-be-cooled line 106 of this product, the product needs to be remodeled drastically. In this modification, since the auxiliary heat exchanger 103 need not be provided on the medium-to-be-cooled line 106 of this product, the temperature of the medium to be cooled can be managed without drastically remodeling the product.

Sixth Modification of the Temperature Regulator

Figure 8:
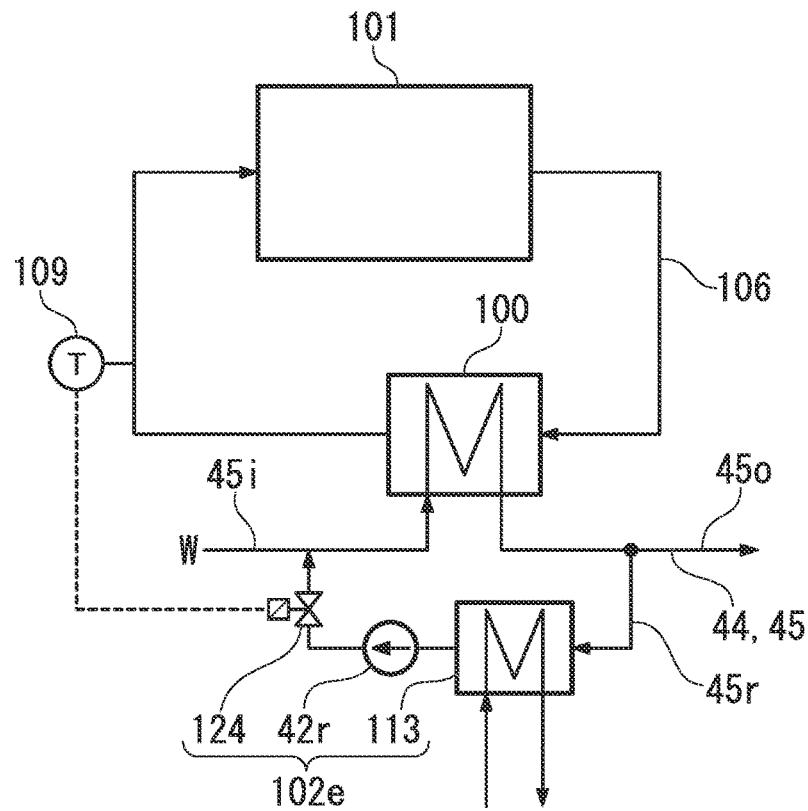
FIG. 8 is an illustrative diagram showing the constitution of a temperature regulator in a sixth modification according to the present invention.

A sixth modification of the temperature regulator will be described with reference to FIG. 8.

In the temperature regulator of the first embodiment, the temperature regulators of the first to third modifications, and the temperature regulator of the fifth modification, the flow rate of the external medium flowing into the auxiliary heat exchanger is regulated. In the temperature regulator of the fourth modification, a flow rate of a medium to be cooled flowing into an auxiliary heat exchanger is regulated. However, as in this modification, a flow rate of supply-water W may be regulated.

A supplied water inflow line 45i and a supplied water outflow line 45o of this modification are connected by a supply-water return line 45r. A temperature regulator 102e of this modification has an auxiliary heat exchanger 113, a supplied water return pump 42r, and a supply-water flow rate regulating valve 124 that are provided on the supply-water return line 45r. Part of the supply-water W heated by a cooler 100 flows into the auxiliary heat exchanger 113 of this modification via the supply-water outflow line 45o and the supply-water return line 45r. The auxiliary heat exchanger 113 exchanges heat between the supply-water W and an external medium, and heats the external medium while cooling the supply-water W (a supplied water auxiliary heat exchanging process). The supply-water flow rate regulating valve 124 regulates the flow rate of the supply-water W flowing into the supply-water return line 45r on the basis of a temperature of a medium to be cooled which is determined by a thermometer 109 provided on a medium-to-be-cooled line 106. In other words, the supply-water flow rate regulating valve 124 regulates the flow rate and a temperature of the supply-water W flowing into the auxiliary heat exchanger 113 (a temperature regulating process, a heat exchange amount regulating process, and a flow rate regulating process). As a result, the flow rate and temperature of the supply-water W flowing into the cooler 100 are changed, and the temperature of the medium to be cooled that exchanges heat with the supply-water W in the cooler 100 falls within a target temperature range.

As in this modification and the fifth modification, there is no need to provide the auxiliary heat exchanger 103 on the medium-to-be-cooled line 106. For this reason, in this modification, as in the fifth modification, even in a product in which it is difficult to remodel the medium-to-be-cooled line 106, the temperature of the medium to be cooled can be managed without drastically remodeling the product.

Seventh Modification of the Temperature Regulator

Figure 9:
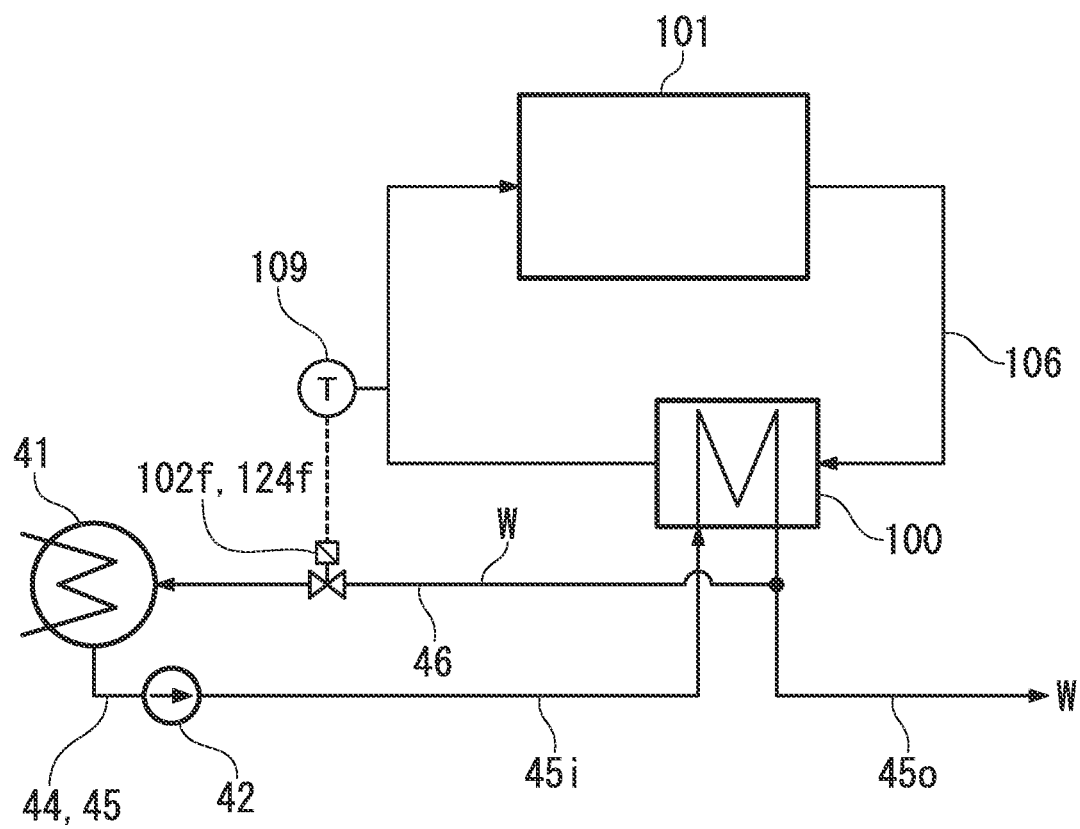
FIG. 9 is an illustrative diagram showing the constitution of a temperature regulator in a seventh modification according to the present invention.

A seventh modification of the temperature regulator will be described with reference to FIG. 9.

The temperature regulator of the first embodiment and the temperature regulator of the first to sixth modifications have the auxiliary heat exchanger. However, as in this modification, a temperature regulator 102f may not have the auxiliary heat exchanger.

In this modification, a supplied water outflow line 45o and a steam condenser 41 are connected by a supply-water return line 46. A supply-water reflow flow rate regulating valve 124f that regulates a flow rate of supply-water W flowing along the supply-water return line 46 is provided on the supply-water return line 46. The temperature regulator 102f of this modification has the supply-water reflow flow rate regulating valve 124f. When a degree of opening of the supply-water reflow flow rate regulating valve 124f is changed, the flow rate of the supply-water W flowing along the supply-water return line 46 is changed. For this reason, when the degree of opening of the supply-water reflow flow rate regulating valve 124f is changed, the flow rate of the supply-water W flowing into a cooler 100 via a supplied water inflow line 45i from the steam condenser 41 is also changed. Therefore, in this modification, when the degree of opening of the supply-water reflow flow rate regulating valve 124f is changed, an amount of heat exchange between the supply-water W and a medium to be cooled in the cooler 100 is changed. In this modification, the degree of opening of the supply-water reflow flow rate regulating valve 124f is regulated on the basis of a temperature of the medium to be cooled which is determined by a thermometer 109 provided on a medium-to-be-cooled line 106 (a temperature regulating process, a heat exchange amount regulating process, and a flow rate regulating process). As a result, the amount of heat exchange between the supply-water W and the medium to be cooled in the cooler 100 is changed, and the temperature of the medium to be cooled falls within a target temperature range.

In this modification, as described above, there is no need to provide an auxiliary heat exchanger. For this reason, facility costs for regulating the temperature of the medium to be cooled can be suppressed. In this modification, as in the fifth and sixth modifications, even in a product in which it is difficult to remodel the medium-to-be-cooled line 106, the temperature of the medium to be cooled can be managed without drastically remodeling the product. In this modification, a flow rate of supply-water W flowing along a supply-water return line 46 is regulated, and thereby the flow rate of the supply-water W flowing along a supply-water main line 45 can be regulated. In this modification, a range in which the temperature of the medium to be cooled is regulated can be made wider than a case in which the flow rate of the supply-water W flowing along the supply-water main line 45 is constant. That is, in this modification, the range in which the temperature of the medium to be cooled is regulated can be widened with a simple constitution.

This modification is a modification of the temperature regulator with the auxiliary heat exchanger, but it may also be applied to a temperature regulator without the auxiliary heat exchanger. For example, this modification may also be applied to the intake air temperature regulator 53 for the intake air cooler 50 of the first embodiment. In this case, a bypass line for the heat exchanger 52 is provided on the intermediate medium line 56, and the medium flow rate regulating valve 54 is provided on this bypass line.

Eighth Modification of the Temperature Regulator

Figure 10:
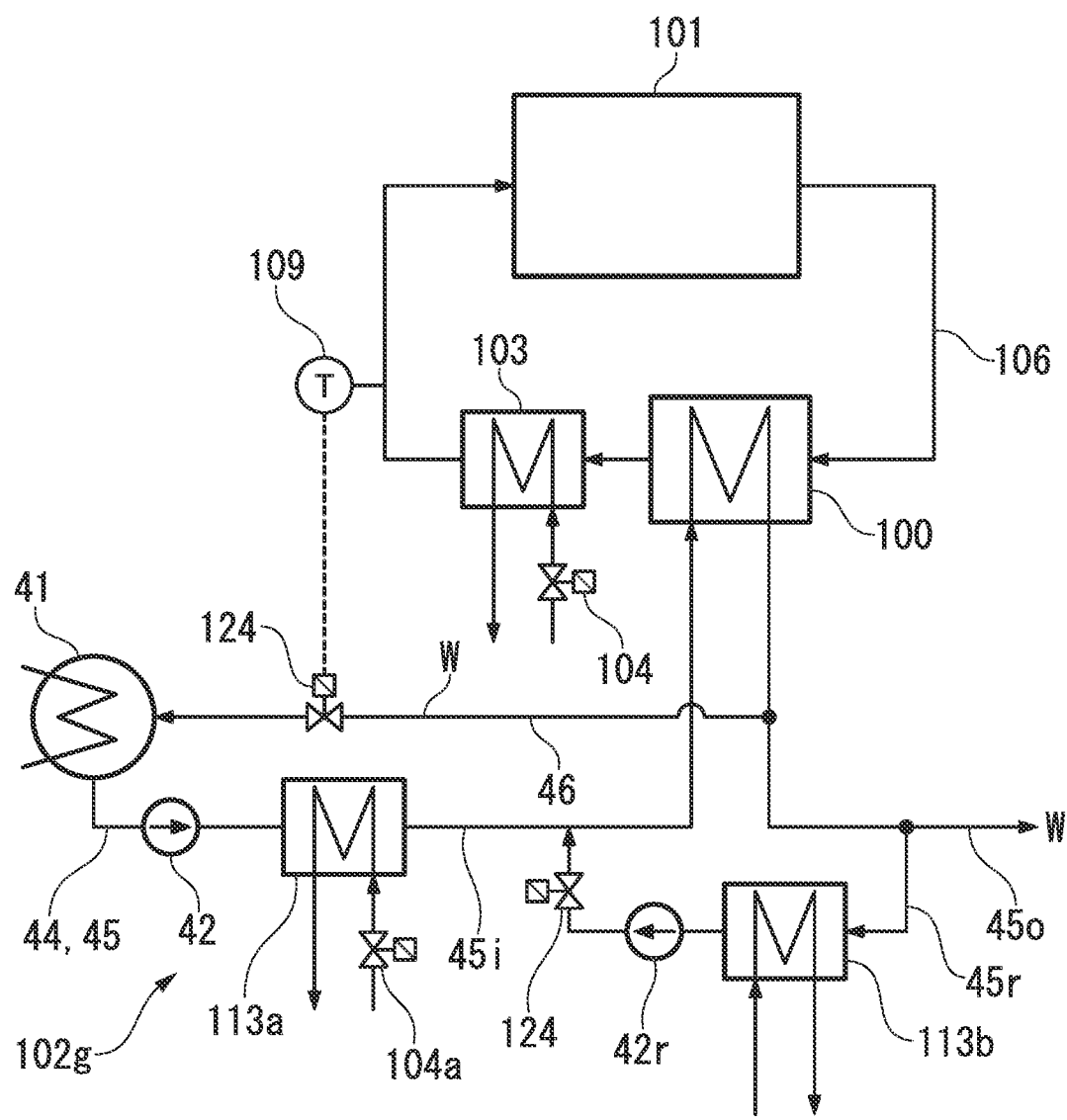
FIG. 10 is an illustrative diagram showing the constitution of a temperature regulator in an eighth modification according to the present invention.

An eighth modification of the temperature regulator will be described with reference to FIG. 10.

A temperature regulator 102g of this modification is to combine the temperature regulator of the first embodiment and the temperature regulators of the fifth to seventh modifications.

In this modification, a supplied water outflow line 45o and a steam condenser 41 are connected by a supply-water return line 46. In this modification, a supplied water inflow line 45i and the supply-water outflow line 45o are connected by a supply-water return line 45r. The temperature regulator 102g of this modification has a medium auxiliary heat exchanger 103, an external medium flow rate regulating valve 104 that regulates a flow rate of an external medium flowing into a medium auxiliary heat exchanger 103, a first supply-water auxiliary heat exchanger 113a, an external medium flow rate regulating valve 104a that regulates the flow rate of the external medium flowing into the first supply-water auxiliary heat exchanger 113a, a second supply-water auxiliary heat exchanger 113b, a supplied water return pump 42r, a supply-water flow rate regulating valve 124 that regulates a flow rate of supply-water W flowing into a second supply-water auxiliary heat exchanger 113b, and a supply-water reflow flow rate regulating valve 124f.

The medium auxiliary heat exchanger 103 is provided on a medium-to-be-cooled line 106, exchanges heat between a medium to be cooled and the external medium, and cools the medium to be cooled while heating the external medium. The first supply-water auxiliary heat exchanger 113a is provided on the supply-water inflow line 45i, exchanges heat between the supply-water W flowing along the supply-water inflow line 45i and the external medium, and cools the supply-water W while heating the external medium. The supply-water return pump 42r is provided on the supply-water return line 45r. The second supply-water auxiliary heat exchanger 113b is provided on the supply-water return line 45r, exchanges heat between the supply-water W flowing along the supply-water return line 45r and the external medium, and cools the supply-water W while heating the external medium. The supply-water flow rate regulating valve 124 is provided on the supply-water return line 45r. The supply-water reflow flow rate regulating valve 124f is provided on the supply-water return line 46. In this modification, the degree of opening of at least one of the external medium flow rate regulating valve 104, the external medium flow rate regulating valve 104a, the supply-water flow rate regulating valve 124, and the supply-water reflow flow rate regulating valve 124f is regulated on the basis of a temperature of the medium to be cooled which is determined by a thermometer 109 provided on the medium-to-be-cooled line 106 (a temperature regulating process, a heat exchange amount regulating process, and a flow rate regulating process). As a result, an amount of heat exchange between the supply-water W and the medium to be cooled in the cooler 100 is changed, and the temperature of the medium to be cooled falls within a target temperature range.

Since the temperature regulator 102g of this modification has a plurality of temperature regulating functions, a range in which the temperature of the medium to be cooled is regulated can be widened.

Ninth Modification of the Temperature Regulator

Figure 11:
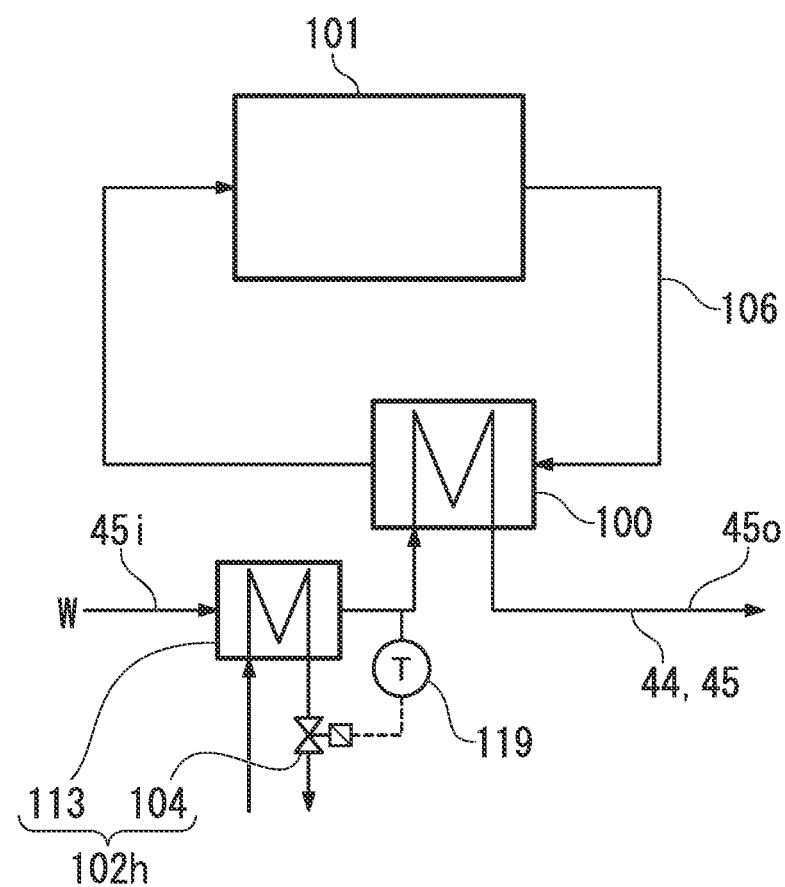
FIG. 11 is an illustrative diagram showing the constitution of a temperature regulator in a ninth modification according to the present invention.

A ninth modification of the temperature regulator will be described with reference to FIG. 11.

In the temperature regulator of the first embodiment and the temperature regulators of the first to eighth modifications, the degree of opening of the flow rate regulating valve is regulated on the basis of the temperature of the medium to be cooled. However, in this modification, a degree of opening of a flow rate regulating valve 104 may be regulated on the basis of a temperature of supply-water W.

As in the fifth modification, a temperature regulator 102h of this modification has an auxiliary heat exchanger 113 that is provided on a supplied water inflow line 45i, and an external medium flow rate regulating valve 104 that regulates a flow rate of an external medium flowing into the auxiliary heat exchanger 113. A thermometer 119 is provided on the supply-water inflow line 45i between the auxiliary heat exchanger 113 and a cooler 100. The thermometer 119 determines the temperature of the supply-water W before the supply-water W flows out of the auxiliary heat exchanger 113 and flows into the cooler 100 (a temperature determining process). The external medium flow rate regulating valve 104 regulates the flow rate of the external medium flowing into the auxiliary heat exchanger 113 on the basis of the temperature of the supply-water W which is determined by the thermometer 119 provided on the supply-water inflow line 45i (a temperature regulating process, a heat exchange amount regulating process, and a flow rate regulating process). As a result, the temperature of the supply-water W flowing into the cooler 100 is changed, and the temperature of a medium to be cooled that exchanges heat with the supply-water W in the cooler 100 falls within a target temperature range.

Tenth Modification of the Temperature Regulator

Figure 12:
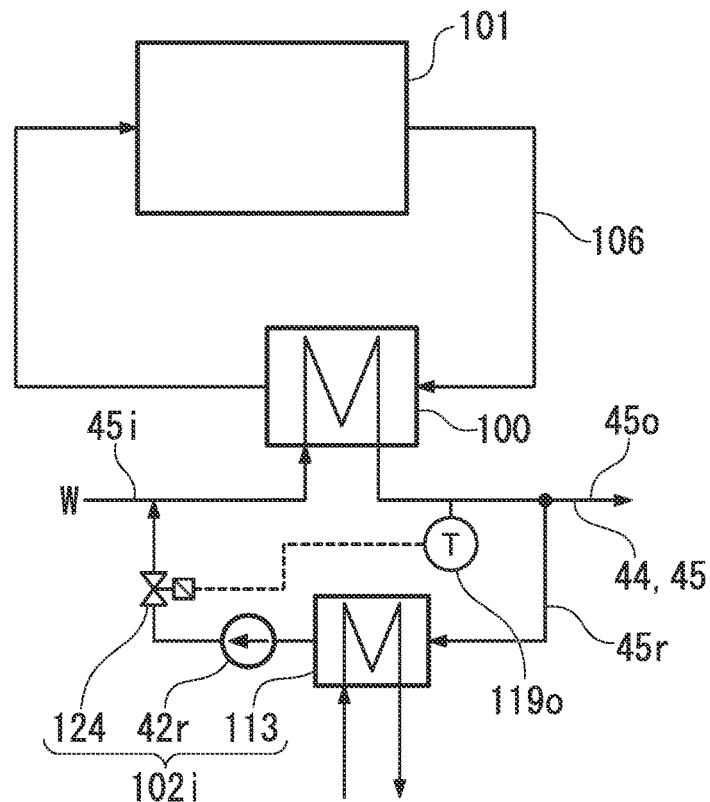
FIG. 12 is an illustrative diagram showing the constitution of a temperature regulator in a tenth modification according to the present invention.

A tenth modification of the temperature regulator will be described with reference to FIG. 12.

This modification is a modification of the sixth modification. In the sixth modification, the degree of opening of the supply-water flow rate regulating valve 124 is regulated on the basis of the temperature of the medium to be cooled. However, as in this modification, a degree of opening of a supply-water flow rate regulating valve 124 is regulated on the basis of a temperature of supply-water W.

A thermometer 119i of this modification is provided on a supplied water outflow line 45o, and determines the temperature of the supply-water W flowing out of a cooler 100 (a temperature determining process). Like the temperature regulator 102e of the sixth modification, a temperature regulator 102i of this modification has a supply-water auxiliary heat exchanger 113, a supplied water return pump 42r, and the supply-water flow rate regulating valve 124 that are provided on a supply-water return line 45r. In this modification, the supply-water flow rate regulating valve 124 regulates the temperature of the supply-water W flowing into the supply-water return line 45r on the basis of a temperature of the supply-water W which is determined by the thermometer 119i provided on the supply-water outflow line 45o (a temperature regulating process, a heat exchange amount regulating process, and a flow rate regulating process). As a result, the temperature and a flow rate of the supply-water W flowing into the cooler 100 are changed, and a temperature of a medium to be cooled that exchanges heat with the supply-water W in the cooler 100 falls within a target temperature range.

Eleventh Modification of the Temperature Regulator

Figure 13:
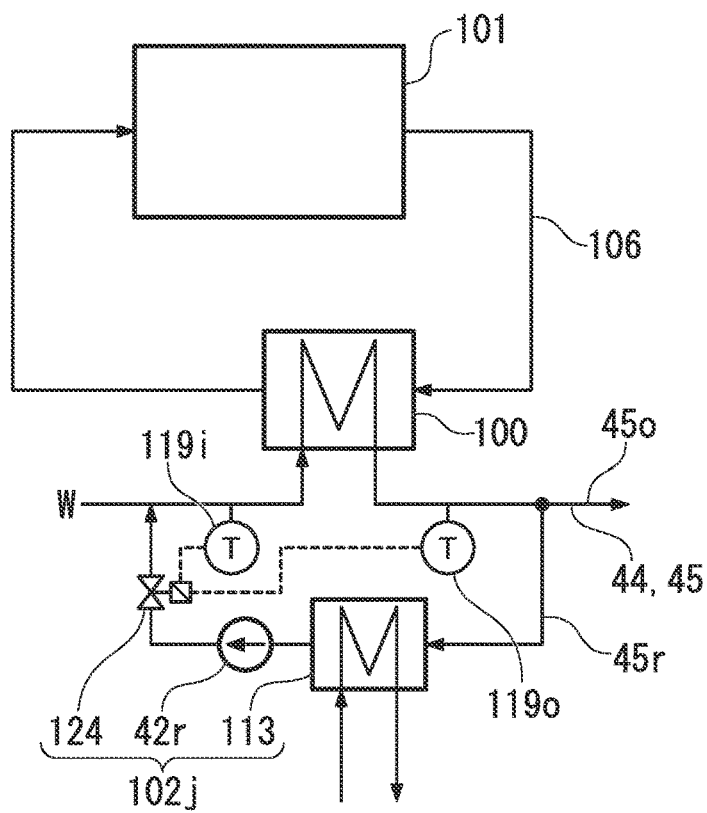
FIG. 13 is an illustrative diagram showing the constitution of a temperature regulator in an eleventh modification according to the present invention.

An eleventh modification of the temperature regulator will be described with reference to FIG. 13.

This modification is a modification of the tenth modification. In the sixth modification, the degree of opening of the supply-water flow rate regulating valve 124 is regulated only by the temperature of the supply-water W flowing out of the cooler 100. In this modification, a degree of opening of a supply-water flow rate regulating valve 124 is regulated on the basis of a temperature of supply-water W flowing into a cooler 100 and a temperature of the supply-water W flowing out of the cooler 100.

In this modification, a first thermometer 119*i* is provided on a supplied water inflow line 45*i*, and simultaneously a second thermometer 119*o* is provided on a supplied water outflow line 45*o*. The first thermometer 119*i* determines the temperature of supply-water W flowing into the cooler 100. The second thermometer 119*o* determines the temperature of the supply-water W flowing out of the cooler 100 (a temperature determining process). Like the temperature regulators of the sixth and tenth modifications, a temperature regulator 102*j* of this modification has a supply-water auxiliary heat exchanger 113, a supplied water return pump 42*r*, and the supply-water flow rate regulating valve 124 that are provided on a supply-water return line 45*r*. In this modification, the supply-water flow rate regulating valve 124 regulates the temperature of supply-water W flowing into the supply-water return line 45*r* on the basis of a difference between the temperature of supply-water W flowing into the cooler 100 and the temperature of the supply-water W flowing out of the cooler 100 (a temperature regulating process, a heat exchange amount regulating process, and a flow rate regulating process). As a result, the temperature and a flow rate of supply-water W flowing into the cooler 100 are changed, and a temperature of a medium to be cooled that exchanges heat with the supply-water W in the cooler 100 falls within a target temperature range.

In this modification, since the difference between the temperature of supply-water W flowing into the cooler 100 and the temperature of the supply-water W flowing out of the cooler 100 is acquired, an amount of heat exchange in the cooler 100 can be more accurately checked than in the tenth modification. For this reason, in this modification, the temperature of the medium to be cooled can be more accurately regulated than in the tenth modification.

In this modification and the ninth and tenth modifications, both the auxiliary heat exchanger and the thermometer are provided on a water supply line 44. For this reason, in these modifications, both the auxiliary heat exchanger and the thermometer need not be provided on a medium-to-be-cooled line 106. Therefore, in these modifications, even in a product in which it is difficult to remodel the medium-to-be-cooled line 106, the temperature of the medium to be cooled can be managed without entirely remodeling the product.

This modification and the ninth and tenth modifications are examples in which, when the auxiliary heat exchanger 113 is provided on the water supply line 44, the degree of opening of the flow rate regulating valve is changed on the basis of the temperature of the supply-water W. However, even when the auxiliary heat exchanger 113 is provided on the medium-to-be-cooled line 106, the degree of opening of the flow rate regulating valve may be changed on the basis of the temperature of the supply-water W.

Second Embodiment of the Plant

Figure 14:
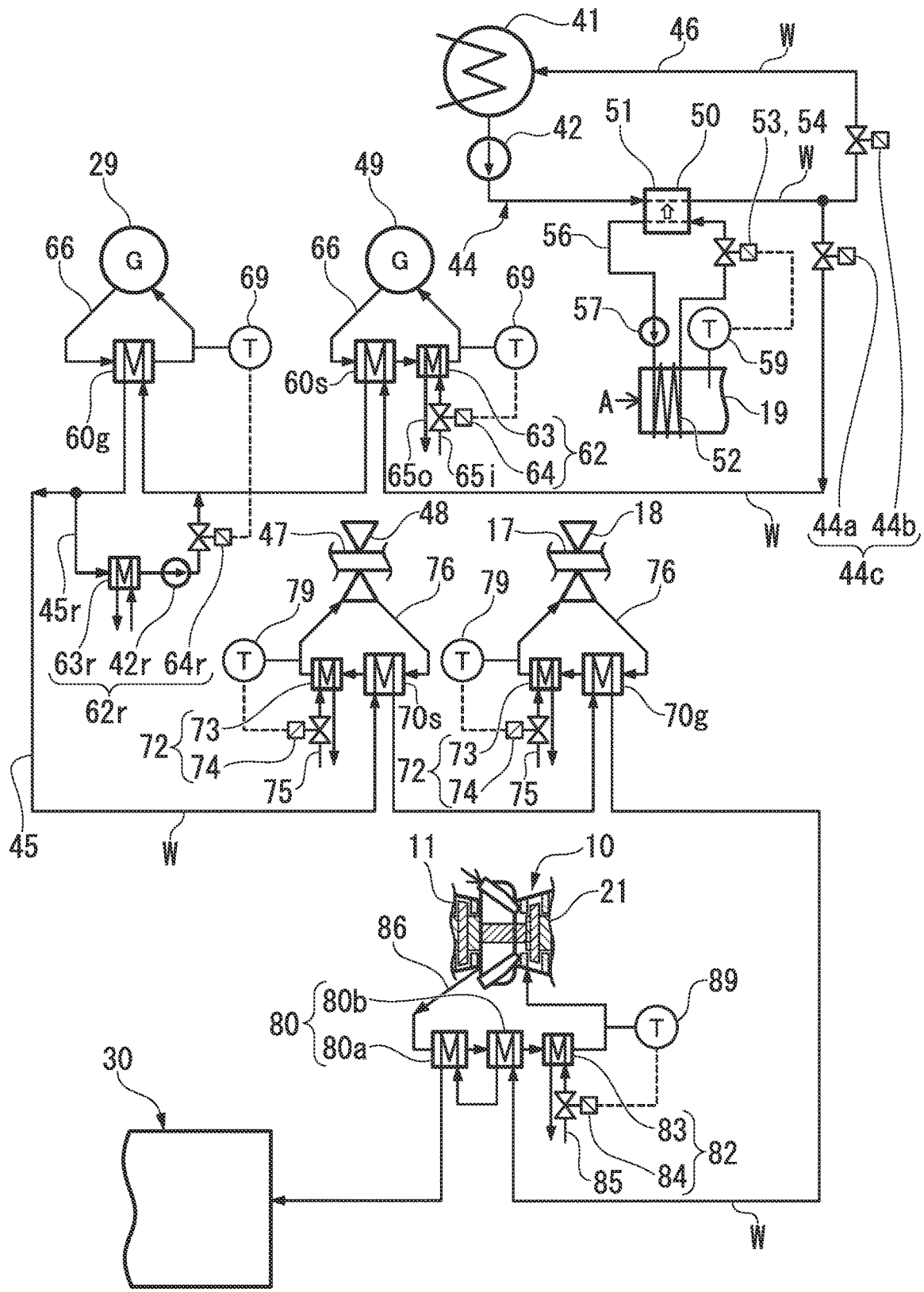
FIG. 14 is a system diagram of a water supply line in a second embodiment according to the present invention.

A second embodiment of the plant according to the present invention will be described with reference to FIG. 14.

The plant of the present embodiment is a modification of the plant of the first embodiment. As in the first embodiment, an intake air cooler 50, a generator cooler 60*s* of a generator 49 connected to a steam turbine, a generator cooler 60*g* of a generator 29 connected to a gas turbine, a lubricant cooler 70*s* of the steam turbine, a lubricant cooler 70*g* of the gas turbine, and a compressed air cooler 80 of the gas turbine are also provided on a supply-water main line 45 of the plant of the present embodiment. Any of the intake air cooler 50, the generator cooler 60*g* of the generator 29 connected to the gas turbine, the lubricant cooler 70*g* of the gas turbine, and the compressed air cooler 80 of the gas turbine is a GT cooler related to the gas turbine. In addition, any of the generator cooler 60*s* of the generator 49 connected to the steam turbine and the lubricant cooler 70*s* of the steam turbine is an ST cooler related to the steam turbine.

As in the first embodiment, the intake air cooler 50 is provided with an intake air temperature regulator 53. As in the first embodiment, the generator cooler 60*s* is provided with a medium temperature regulator 62. As in the first embodiment, each of the lubricant coolers 70*s* and 70*g* is provided with a lubricant temperature regulator 72. As in the first embodiment, the compressed air cooler 80 is provided with a compressed air temperature regulator 82.

The generator cooler 60*g* of the generator 29 connected to the gas turbine is provided with a temperature regulator 62*r* that is identical to the temperature regulator described in the sixth modification. Portions located at downstream and upstream sides of a flow of supply-water W flowing along the supply-water main line 45 on the basis of the generator cooler (the downstream side GT cooler) 60*g* on the supply-water main line are connected by a supply-water return line 44*r*. A temperature regulator 62*r* for the generator cooler 60*g* has an auxiliary heat exchanger 63*r*, a supplied water return pump 42*r*, and a supply-water flow rate regulating valve 64*r*. Part of the supply-water W heated by the generator cooler 60*g* flows into the auxiliary heat exchanger 63*r* via the supply-water return line 44*r*. The auxiliary heat exchanger 63*r* allows heat exchange between the supply-water W and an external medium, and heats the external medium while cooling the supply-water W (a supplied water auxiliary heat exchanging process). The supply-water return pump 42*r* is provided on the supply-water return line 44*r*. The supply-water return pump 42*r* forces the supply-water W in the supply-water return line 44*r* to flow from a downstream side to an upstream side on the supply-water main line 45. That is, the supply-water return pump 42*r* guides at least part of the supply-water W passing through the generator cooler 60*g* to the supply-water return line 44*r*, and returns the supply-water W to the generator cooler 60*g* via the supply-water return line 44*r*. The supply-water flow rate regulating valve 64*r* regulates a flow rate of the supply-water W flowing into the supply-water return line 44*r* on the basis of a temperature of a cooling medium which is determined by a medium thermometer 69 provided on a cooling medium line 66. In other words, the supply-water flow rate regulating valve 64*r* regulates the flow rate and temperature of the supply-water W flowing into the auxiliary heat exchanger 63*r* (a temperature regulating process, a heat exchange amount regulating process, and a flow rate regulating process).

As in the first embodiment, the water supply line 44 of the present embodiment also has a supply-water main line 45, a supply-water return line 46, and a switching unit 44*c* that have been described above. The supply-water main line 45 connects the steam condenser 41 to the exhaust heat recovery boiler 30. The supply-water return line 46 branches off from the supply-water main line 45, and returns at least part of the supply-water W flowing along the supply-water main line 45 to the steam condenser 41. The switching unit 44*c* switches the flow of the supply-water W between a supply-water return state in which the supply-water W in the supply-water main line 45 is returned to the steam condenser 41 via the supply-water return line 46 and a supply-water state in which the supply-water W in the supply-water main line 45 is sent to the exhaust heat recovery boiler 30 without being returned to the steam condenser 41. The switching unit 44c has a first valve 44a and a second valve 44b. The first valve 44a is provided at a position located closer to the exhaust heat recovery boiler 30 than the branch position of the supply-water return line 46 on the supply-water main line 45. The second valve 44b is provided on the supply-water return line 46. However, the supply-water return line 46 of the present embodiment branches off from a position between the intake air cooler 50 and the generator cooler 60s on the supply-water main line 45.

In the present embodiment, the switching unit 44c provided on the water supply line 44 is operated. Thereby, as in the first embodiment, the steam turbine is brought to a halt, and only the gas turbine can be independently operated. In this case, the first valve 44a provided on the supply-water main line 45 is closed, and the second valve 44b provided on the supply-water return line 46 is opened. As a result, the supply-water W from the steam condenser 41 is returned to the steam condenser 41 via the supply-water return line 46. That is, the flow of the supply-water W is put in the supply-water return state. In the supply-water return state, the supply-water W circulates in the steam condenser 41, the supply-water main line 45, and the supply-water return line 46. For this reason, the supply-water W does not flow at a downstream side of the flow of the supply-water W from the branch position of the supply-water return line 46 on the supply-water main line 45. Therefore, the supply-water W does not flow into the exhaust heat recovery boiler 30, and the exhaust heat recovery boiler 30 generates no steam.

In the supply-water return state, among the plurality of GT coolers, the intake air cooler 50 is disposed at an upstream side of the flow of the supply-water W from the branch position of the supply-water return line 46 on the supply-water main line 45, and thus the supply-water W flows into the intake air cooler 50. Therefore, in the supply-water return state, heat of air drawn in by the gas turbine can be transferred to the supply-water W by the intake air cooler 50.

Among the plurality of GT coolers, the generator cooler 60g, the lubricant cooler 70g, and the compressed air cooler 80 (the downstream side GT coolers) are disposed at a downstream side of the flow of the supply-water W from the branch position of the supply-water return line 46 on the supply-water main line 45. The temperature regulators 72 and 82 for the lubricant cooler 70g and the compressed air cooler 80 among these downstream side GT coolers have medium auxiliary heat exchangers 73 and 83 that allow heat exchange between a medium to be cooled (a lubricant or compressed air) and an external medium, and external medium flow rate regulating valves 74 and 84 that regulate amounts of heat change in the medium auxiliary heat exchangers 73 and 83 and act as the heat exchange amount regulators. Therefore, even when the supply-water W flows into the lubricant cooler 70g and the compressed air cooler 80, the medium to be cooled (the lubricant or the compressed air) can be cooled by the medium auxiliary heat exchangers 73 and 83. That is, in the supply-water return state, the lubricant can be cooled by the lubricant cooler 70g, and the compressed air can be cooled by the compressed air cooler 80.

In the temperature regulator 62r for the generator cooler 60g among the downstream side GT coolers, the supply-water W in the supply-water return line 44r is cooled, and the supply-water W can be sent to the generator cooler 60g. Therefore, in the supply-water return state, the cooling medium of the generator can be cooled by the generator cooler 60g.

Therefore, in the present embodiment, even when the flow of the supply-water W is put in the supply-water return state in order to bring the steam turbine to a halt and to independently operate only the gas turbine, the media to be cooled in all the GT coolers can be cooled.

Third Embodiment of the Plant

Figure 15:
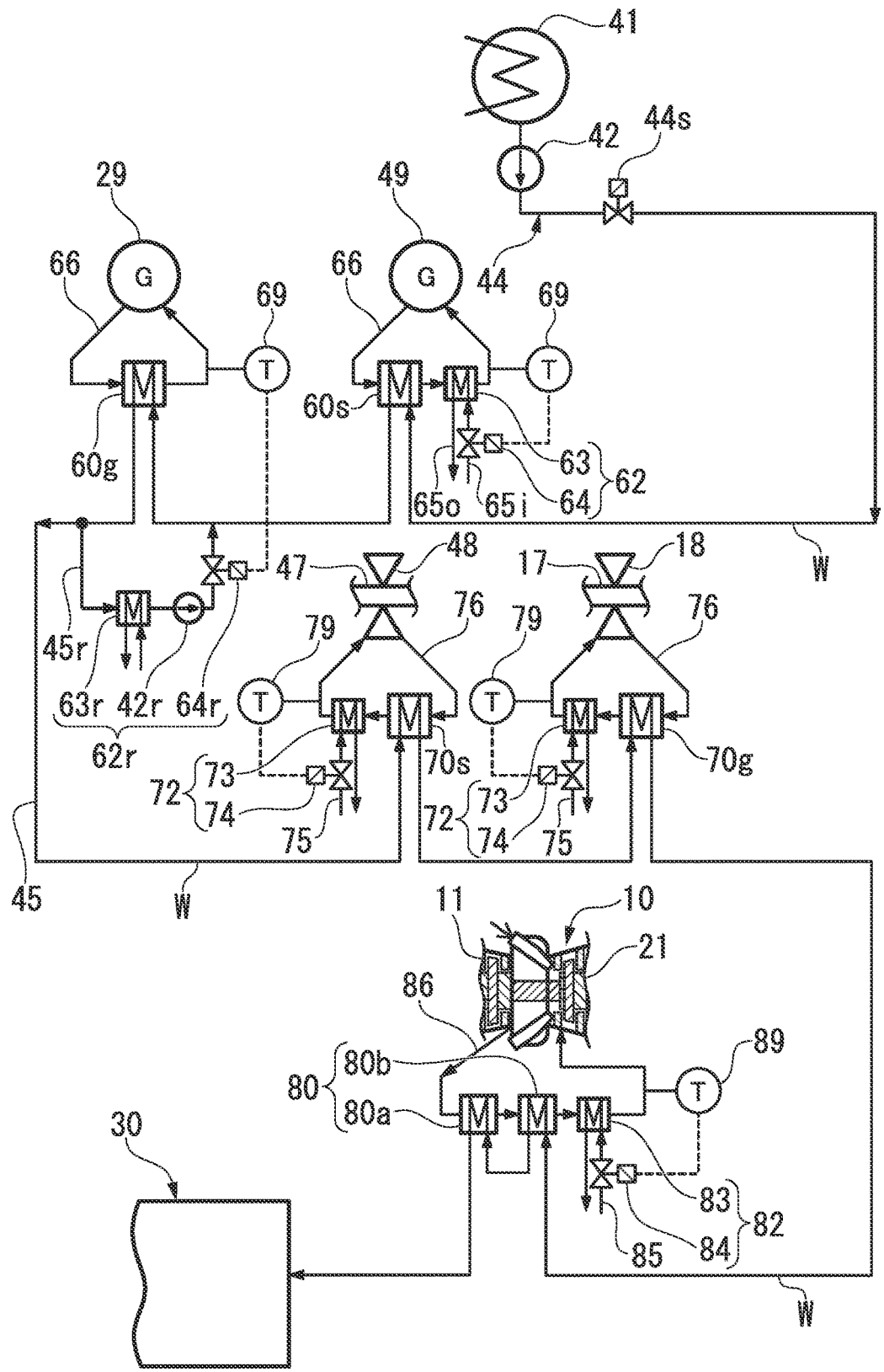
FIG. 15 is a system diagram of a water supply line in a third embodiment according to the present invention.

A third embodiment of the plant according to the present invention will be described with reference to FIG. 15.

The plant of the present embodiment is a modification of the plant of the second embodiment. A generator cooler 60s of a generator 49 connected to a steam turbine, a generator cooler 60g of a generator 29 connected to a gas turbine, a lubricant cooler 70s of the steam turbine, a lubricant cooler 70g of the gas turbine, and a compressed air cooler 80 of the gas turbine are provided on a supply-water main line 45 of the plant of the present embodiment. Any of the generator cooler 60g of the generator 29 connected to the gas turbine, the lubricant cooler 70g of the gas turbine, and the compressed air cooler 80 of the gas turbine is a GT cooler related to the gas turbine. In addition, any of the generator cooler 60s of the generator 49 connected to the steam turbine and the lubricant cooler 70s of the steam turbine is an ST cooler related to the steam turbine.

As in the first and second embodiments, the generator cooler 60s is provided with a medium temperature regulator 62. As in the first and second embodiments, each of the lubricant coolers 70s and 70g is provided with a lubricant temperature regulator 72. As in the first and second embodiments, the compressed air cooler 80 is provided with a compressed air temperature regulator 82. As in the second embodiment, the generator cooler 60g of the generator 29 connected to the gas turbine is provided with a temperature regulator 62r provided on a supply-water return line 44r.

A water supply line 44 of the present embodiment has the supply-water main line 45, but it does not have a supply-water return line 46 that branches off from the supply-water main line 45. A supplied water valve 44s is provided on the supply-water main line 45.

Temperature regulators 62r, 72 and 82 for the plurality of GT cooler 60g, 70g and 80 in the present embodiment are the temperature regulators for the plurality of downstream side GT coolers in the second embodiment. For this reason, even when supply-water W from a steam condenser 41 is not sent to an exhaust heat recovery boiler via the supply-water main line 45, media to be cooled in all the GT coolers 60g, 70g and 80 can be cooled. Therefore, in the present embodiment, the steam turbine is brought to a halt, and only the gas turbine can be independently operated.

Fourth Embodiment of the Plant

Figure 16:
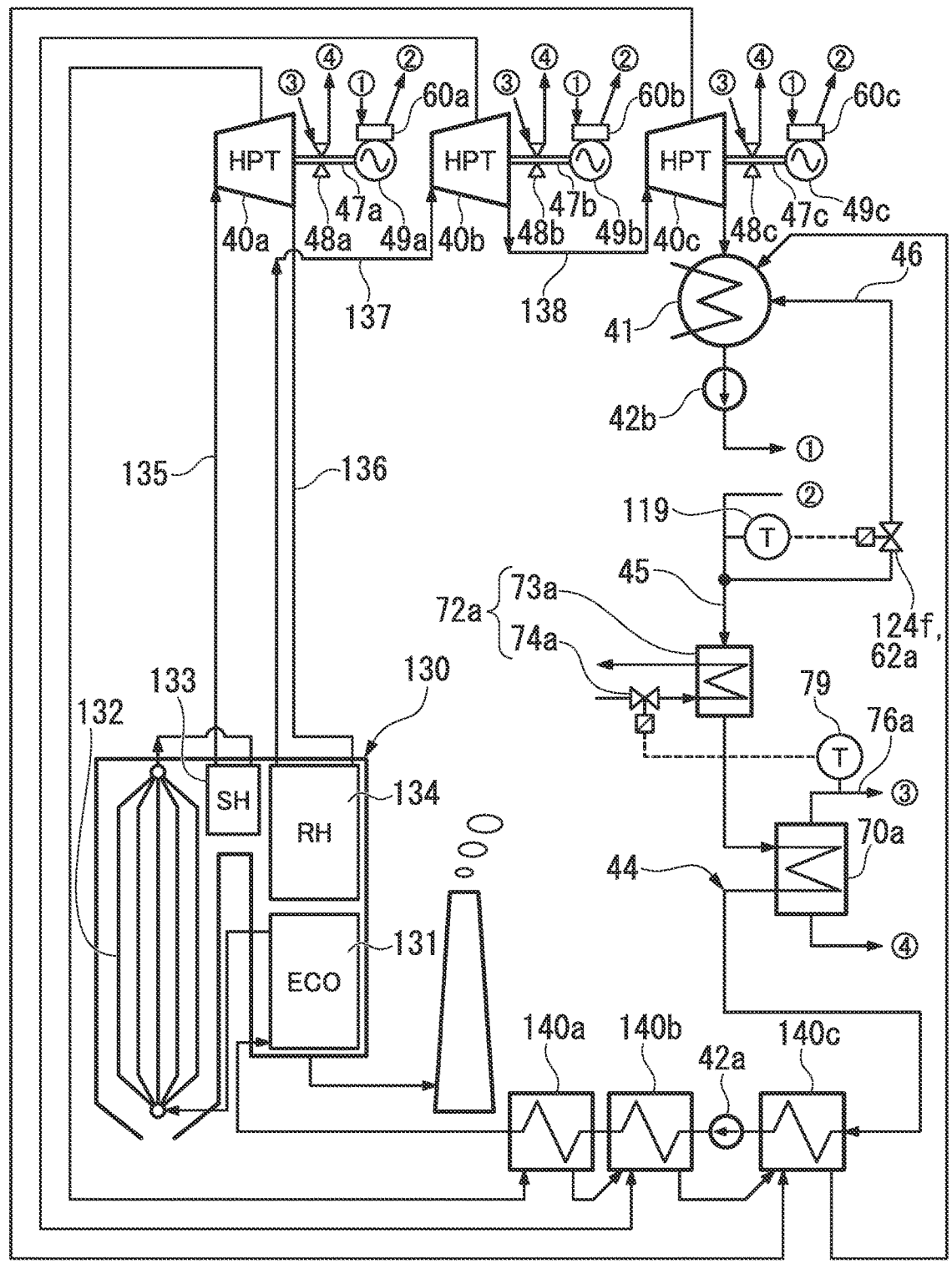
FIG. 16 is a system diagram of a plant in a fourth embodiment according to the present invention.

A fourth embodiment of the plant according to the present invention will be described with reference to FIG. 16.

Each of the plants of the first to third embodiments includes the exhaust heat recovery boiler 30 that generates the steam with the heat of the exhaust gas from the gas turbine 10. However, the boiler need not be the exhaust heat recovery boiler 30. For example, the boiler may be a conventional boiler in which fuel is burnt to generate steam or a nuclear reactor that generates steam with atomic energy.

The plant of the present embodiment includes a boiler 130, steam turbines 40a, 40b and 40c that are driven by steam from the boiler 130, generators 49a, 49b and 49c that generate electricity by driving the steam turbine 40a, 40b and 40c, a steam condenser (a water supply source) 41 that returns steam exhausted from the steam turbine 40c to water, a water supply line 44 that connects the steam condenser 41 and the boiler 130, supply-water preheaters 140a, 140b and 140c that heat water supplied to the boiler 130, a condensate pump 42b that draws in water inside the steam condenser 41 and discharges it into the water supply line 44, and a water supply pump 42a that boosts the pressure of the water inside the water supply line 44 and sends it to the boiler 130.

The boiler 130 of the present embodiment is a conventional boiler in which fuel is burnt to generate steam. However, as described above, the boiler 130 may be a nuclear reactor that generates steam with atomic energy.

The boiler 130 has an economizer 131 that heats the supply-water W from the water supply line 44, an evaporator 132 that further heats the supply-water W heated by the economizer 131 and generates steam, a superheater 133 that superheats the steam from the evaporator 132, and a reheater 134 that superheats the steam exhausted from the steam turbine 40a.

In the present embodiment, the steam turbines are a high-pressure steam turbine 40a, an intermediate-pressure steam turbine 40b, and a low-pressure steam turbine 40c. The generators 49a, 49b and 49c are connected to the steam turbines 40a, 40b and 40c, respectively. The superheater 133 of the boiler 130 and a steam inlet of the high-pressure steam turbine 40a are connected by a high-pressure steam line 135. A steam outlet of the high-pressure steam turbine 40a and the reheater 134 are connected by a high-pressure exhaust line 136. The reheater 134 and a steam inlet of the intermediate-pressure steam turbine 40b are connected by an intermediate-pressure steam line 137. A steam outlet of the intermediate-pressure steam turbine 40b and a steam inlet of the low-pressure steam turbine 40c are connected by an intermediate-pressure exhaust line 138. The steam condenser 41 is connected to a steam outlet of the low-pressure steam turbine 40c.

In the present embodiment, the supply-water preheaters are a low-temperature preheater 140c, an intermediate-temperature preheater 140b, and a high-temperature preheater 140a. The low-temperature preheater 140c, the intermediate-temperature preheater 140b, and the high-temperature preheater 140a are provided at positions located at a downstream side of a flow of the supply-water W from the condensate pump 42b on the water supply line 44. The low-temperature preheater 140c, the intermediate-temperature preheater 140b, and the high-temperature preheater 140a are arranged at the downside side of the flow of the supply-water W in this order. Steam extracted from the high-pressure steam turbine 40a flows into the high-temperature preheater 140a. Steam extracted from the intermediate-pressure steam turbine 40b and steam exhausted from the high-temperature preheater 140a flow into the intermediate-temperature preheater 140b. Steam exhausted from the low-pressure steam turbine 40c and seam exhausted from the intermediate-temperature preheater 140b flow into the low-temperature preheater 140c. Steam exhausted from the low-temperature preheater 140c flows into the steam condenser 41. The water supply pump 42a is provided between the low-temperature preheater 140c and the intermediate-temperature preheater 140b on the water supply line 44.

The water supply line 44 has a supply-water main line 45 and a supply-water return line 46. The supply-water main line 45 connects the steam condenser 41 and the economizer 131 of the boiler 130. The supply-water return line 46 branches off from the supply-water main line 45, and returns at least part of the supply-water W flowing along the supply-water main line 45 to the steam condenser 41.

Rotors of the generators 49a, 49b and 49c are connected to turbine rotors 47a, 47b and 47c of the high-pressure steam turbine 40a, the intermediate-pressure steam turbine 40b, and the low-pressure steam turbine 40c. The rotors and stators of the generators 49a, 49b and 49c are cooled by a cooling medium such as hydrogen. For this reason, the generators 49a, 49b and 49c are provided with generator coolers 60a, 60b and 60c that cool the cooling medium by heat exchange with water. The generator coolers 60a, 60b and 60c are provided at positions located at an upstream side of the flow of the supply-water W from the branch position of the supply-water return line 46 on the supply-water main line 45. The turbine rotors 47a, 47b and 47c of the steam turbines 40a, 40b and 40c are rotatably supported by bearings 48a, 48b and 48c. The plurality of bearings 48a, 48b and 48c are connected to one lubricant cooler 70a that cools lubricants from the bearings 48a, 48b and 48c by heat exchange with water and returns the lubricants to the bearings 48a, 48b and 48c. The lubricant cooler 70a is provided on the supply-water main line 45 at a position between the branch position of the supply-water return line 46 and the low-temperature preheater 140c. The lubricant cooler 70a is connected to a lubricant line 76a that forms a circulation line among the bearings 48a, 48b and 48c of the steam turbines 40a, 40b and 40c.

A supplied water thermometer 119 is provided on the supply-water main line 45 at a position that is located at a downstream side of the flow of the supply-water W from all the generator coolers 60a, 60b and 60c and is located at an upstream side of the flow of the supply-water W from the branch position of the supply-water return line 46. As in the seventh modification, a supply-water reflow flow rate regulating valve 124f that regulates a flow rate of the supply-water W flowing along the supply-water return line 46 is provided on the supply-water return line 46. A temperature regulator 62a for the generator coolers 60a, 60b and 60c of the present embodiment as the supply-water reflow flow rate regulating valve 124f. When the degree of opening of the supply-water reflow flow rate regulating valve 124f is changed, the flow rate of the supply-water W flowing along the supply-water return line 46 is changed. For this reason, when the degree of opening of the supply-water reflow flow rate regulating valve 124f is changed, the flow rate of the supply-water W flowing from the steam condenser 41 into the generator coolers 60a, 60b and 60c via the supply-water main line 45 is also changed. Therefore, in the present embodiment, when the degree of opening of the supply-water reflow flow rate regulating valve 124f is changed, an amount of heat exchange between the supply-water W and the cooling medium that is the medium to be cooled is changed. In the present embodiment, the degree of opening of the supply-water reflow flow rate regulating valve 124f is regulated on the basis of a temperature of the supply-water W which is determined by the supply-water thermometer 119 provided on the supply-water main line 45 (a temperature regulating process, a heat exchange amount regulating process, and a flow rate regulating process). As a result, the amount of heat exchange between the supply-water W and the cooling medium (the medium to be cooled) in each of the generator coolers 60a, 60b and 60c is changed, and a temperature of the cooling medium falls within a target temperature range.

A lubricant thermometer 79 that determines a temperature of the lubricant flowing along the lubricant line 76 is provided on the lubricant line 76. As in the fifth modification, an auxiliary heat exchanger 73a is provided between the branch position of the supply-water return line 46 and the lubricant cooler 70*a* on the supply-water main line 45. A temperature regulator 72*a* for the lubricant cooler 70*a* of the present embodiment has the auxiliary heat exchanger 73*a* and an external medium flow rate regulating valve 74*a* that regulates a flow rate of the external medium flowing into the auxiliary heat exchanger 73*a*. The auxiliary heat exchanger 73*a* of the present embodiment allows heat exchange between the external medium and the supply-water W, and heats the external medium while cooling the supply-water W (a supplied water auxiliary heat exchanging process). The external medium flow rate regulating valve 74*a* regulates the flow rate of the external medium flowing into the auxiliary heat exchanger 73*a* on the basis of the temperature of the lubricant as the medium to be cooled which is determined by the lubricant thermometer 79 provided on the lubricant line 76*a* (a temperature regulating process, a heat exchange amount regulating process, and a flow rate regulating process). As a result, the temperature of the supply-water W flowing into the lubricant cooler 70*a* is changed, and the temperature of the lubricant (the medium to be cooled) that exchanges heat with the supply-water W in the lubricant cooler 70*a* falls within a target temperature range.

As described above, in the present embodiment, heat of the medium to be cooled in each device of the plant is transferred to the supply-water W by the cooler, and the medium to be cooled is cooled, whereas the supply-water W is heated. For this reason, the heat of the medium to be cooled can be effectively used. In the present embodiment, the temperature of the medium to be cooled is regulated by the temperature regulator. For this reason, the temperature of the medium to be cooled can be managed to a proper temperature.

In the present embodiment, as in the first embodiment, among the plurality of coolers provided on the supply-water main line 45, the cooler located closer to the downstream side of the flow of the supply-water W has a higher temperature of the medium to be cooled flowing thereinto. For this reason, in the present embodiment, the temperature of the supply-water W can be effectively increased.

The temperature regulator 62*a* for the generator coolers 60*a*, 60*b* and 60*c* of the present embodiment, and the temperature regulator 72*a* for the lubricant cooler 70*a* may be modified to any of the plurality of modifications that have been described above.

Other Modifications

The cooler shown in each of the first to fourth embodiments is an example of the cooler. Therefore, the plant may include a cooler other than coolers shown above and its temperature regulator. The plant of each of the aforementioned embodiments need not include all the coolers shown in each embodiment, and may include at least one cooler.

INDUSTRIAL APPLICABILITY

According to an aspect of the present invention, a temperature of a medium to be cooled can be managed to a proper temperature while effectively using heat of the medium to be cooled related to a device that is directly or indirectly connected to a boiler.

REFERENCE SIGNS LIST

10 Gas turbine
11 Compressor
12 Compressor rotor
15 Compressor casing
19 Air intake duct
20 Combustor
21 Turbine
22 Turbine rotor
23 Rotor shaft
24 Turbine blade
25 Turbine casing
26 Turbine vane
27 Exhaust port
17 Gas turbine rotor
18 Bearing
29 Generator
30 Exhaust heat recovery boiler
35 Steam line
40 Steam turbine
40*a* High-pressure steam turbine
40*b* Intermediate-pressure steam turbine
40*c* Low-pressure steam turbine
47, 47*a*, 47*b*, 47*c* Steam turbine rotor
48, 48*a*, 48*b*, 48*c* Bearing
49, 49*a*, 49*b*, 49*c* Generator
41 Steam condenser (water supply source)
42, 42*a* Water supply pump
42*b* Condensate pump
42*r* Supplied water return pump
44 Water supply line
44*c* Switching unit
44*a* First valve
44*b* Second valve
45 Supply-water main line
45*i* Supply-water inflow line
45*o* Supply-water outflow line
45*r* Supply-water return line
46 Supply-water return line
50 Intake air cooler
51 Freezer (heat transfer device)
52 Heat exchanger
53 Intake air temperature regulator
54 Medium flow rate regulating valve
56 Intermediate medium line
57 Medium pump
59 Intake air thermometer
60*a*, 60*b*, 60*c*, 60*s*, 60*g* Generator cooler
62 Medium temperature regulator
62*a*, 62*r* Temperature regulator
63 Medium auxiliary heat exchanger
64 External medium flow rate regulating valve
65*i* Inflow line
65*o* Outflow line
66 Cooling medium line
69 Medium thermometer
70*a*, 70*s*, 70*g* Lubricant cooler
72 Lubricant temperature regulator
72*a* Temperature regulator
73 Lubricant auxiliary heat exchanger
73*a* Auxiliary heat exchanger
74, 74*a* External medium flow rate regulating valve
75*i* Inflow line
75*o* Outflow line
76, 76*a* Lubricant line
79 Lubricant thermometer
80 Compressed air cooler
80*a* First air cooler
80*b* Second air cooler
82 Compressed air temperature regulator
83 Compressed air auxiliary heat exchanger 84 External medium flow rate regulating valve
85 External medium line
86 Extraction line
89 Cooling air thermometer
100 Cooler
101 Device
102, 102a Temperature regulator
103, 103a, 103b, 103c, 113 Auxiliary heat exchanger
104, 104a, 104b External medium flow rate regulating valve
105i Inflow line
150ia, 105ib Inflow branch line
105o Outflow line
105oa, 105ob Outflow branch line
105b, 105b1, 105b2, 105b3 Bypass line
105c Connection line
106 Medium-to-be-cooled line
106a Medium-to-be-cooled main line
106b Medium-to-be-cooled bypass line
109, 119, 119i, 1190 Thermometer
113 Supply-water auxiliary heat exchanger
113a First supply-water auxiliary heat exchanger
113b Second supply-water auxiliary heat exchanger
114 Medium-to-be-cooled flow rate regulating valve
124 Supply-water flow rate regulating valve
124f Supply-water reflow flow rate regulating valve
130 Boiler
140a High-temperature preheater (supply-water preheater)
140b Intermediate-temperature preheater (supply-water preheater)
140c Low-temperature preheater (supply-water preheater)

The invention claimed is:

1. A plant comprising:
a boiler that is configured to heat water to generate steam;
a steam turbine that is connected to be driven by the steam generated by the boiler;
a steam condenser that is configured to condense steam exhausted from the steam turbine into water;
a water supply line that connects the boiler and the steam condenser and that is configured to supply water that flows from the steam condenser to the boiler;
a medium-to-be-cooled line that is configured to flow a medium to be cooled into the steam turbine;
a cooler configured to transfer heat of the medium to be cooled to supply-water that flows through the water supply line, prior to the supply-water entering the boiler, the cooler being provided in the water supply line and upstream of the boiler with respect to a flow of the supply-water from the steam condenser to the boiler;
a thermometer configured to determine a temperature of the medium to be cooled or the supply-water; and
a temperature regulator configured to regulate the temperature of the medium to be cooled based on the temperature determined by the thermometer,
wherein the temperature regulator has a supply-water return line that is configured to return at least part of the supply-water, which flows from the cooler to the water supply line, prior to the supply-water entering the boiler, to the steam condenser, an upstream end of the supply-water return line is connected to the water supply line upstream of the boiler, and a flow rate regulator that is configured to regulate a flow rate of the supply-water flowing along the supply-water return line on the basis of the temperature determined by the thermometer.

2. A plant comprising:
a gas turbine that is configured to burn fuel and be driven by a combustion gas;
a boiler that is connected to the gas turbine such that the combustion gas driving the gas turbine flows into the boiler as an exhaust gas, and is configured so that a heat of the exhaust gas is able to heat water to generate steam;
a steam turbine that is connected to be driven by the steam generated by the boiler;
a steam condenser that is configured to condense steam exhausted from the steam turbine into water;
a water supply line that connects the boiler and the steam condenser and that is configured to supply water that flows from the steam condenser to the boiler;
a medium-to-be-cooled line that is configured to flow a medium to be cooled for a device of at least one of the gas turbine and the steam turbine;
a cooler configured to transfer heat of the medium to be cooled to supply-water that flows through the water supply line, prior to the supply-water entering the boiler, the cooler being provided in the water supply line and upstream of the boiler with respect to a flow of the supply-water from the steam condenser to the boiler;
a thermometer configured to determine a temperature of the medium to be cooled or the supply-water; and
a temperature regulator configured to regulate the temperature of the medium to be cooled based on the temperature determined by the thermometer,
wherein the temperature regulator has a supply-water return line that is configured to return at least part of the supply-water, which flows from the cooler to the water supply line, prior to the supply-water entering the boiler, to the steam condenser, an upstream end of the supply-water return line is connected to the water supply line at a point which is upstream of the boiler, and a flow rate regulator that is configured to regulate a flow rate of the supply-water flowing along the supply-water return line on the basis of the temperature determined by the thermometer,
wherein the boiler has an economizer that is configured such that the supply-water from the water supply line flows into the economizer,
the water supply line supplies the supply-water to the economizer,
the cooler is arranged downstream of the steam condenser and upstream of the economizer with respect to the flow of the supply-water from the steam condenser to the boiler, and
wherein the water supply line connects a water exit of the cooler and a water inlet of the economizer such that the supply-water is supplied from the water exit of the cooler to the water inlet of the economizer without passing through the steam condenser.

3. The plant according to claim 2, wherein water heated by the cooler flows into the boiler.

4. The plant according to claim 2, wherein the water supply line is connected between an outlet of the steam condenser and an inlet of the boiler.

5. The plant according to claim 2, wherein the water supply line is connected to the boiler at a most upstream point with respect to a flow of the supply-water in the boiler.

6. The plant according to claim 5, wherein
a heat exchanger exchanges heat between the exhaust gas and supply-water, and
the heat exchanger consists of the boiler.

7. The plant according to claim 2, wherein
a heat exchanger exchanges heat between the exhaust gas and supply-water, and
the heat exchanger consists of the boiler.

8. A plant comprising:
a boiler that is configured to heat water to generate steam;
a steam turbine that is connected to be driven by the steam generated by the boiler;
a steam condenser that is configured to condense steam exhausted from the steam turbine into water;
a water supply line configured to supply water that flows from the steam condenser to the boiler;
a medium-to-be-cooled line that is configured to flow a medium to be cooled for the steam turbine;
a cooler configured to transfer heat of the medium to be cooled to supply-water that flows through the water supply line, prior to the supply-water entering the boiler;
a thermometer configured to determine a temperature of the medium to be cooled or the supply-water; and
a temperature regulator configured to regulate the temperature of the medium to be cooled based on the temperature determined by the thermometer,
wherein the temperature regulator has a supply-water return line that is configured to return at least part of the supply-water, which flows from the cooler to the water supply line, prior to the supply-water entering the boiler, to the steam condenser, and a flow rate regulator that is configured to regulate a flow rate of the supply-water flowing along the supply-water return line on the basis of the temperature determined by the thermometer,
wherein the boiler has an economizer configured to heat water, and an evaporator configured to heat the water heated by the economizer and to generate steam,
wherein the economizer is configured such that the supply-water from the water supply line flows into the economizer,
the cooler is arranged downstream of the steam condenser and upstream of the economizer with respect to a flow of the supply-water from the steam condenser to the boiler, and
wherein the water supply line connects a water exit of the cooler and a water inlet of the economizer such that the supply-water is supplied from the water exit of the cooler to the water inlet of the economizer without passing through the steam condenser.

* * * * *